(12) United States Patent
Rebholz et al.

(10) Patent No.: US 9,808,845 B2
(45) Date of Patent: Nov. 7, 2017

(54) ARCUATE SADDLES WITH ADHESIVE STRIPS

(71) Applicant: Buckaroos, Inc., Indianapolis, IN (US)

(72) Inventors: Jeffrey J. Rebholz, Indianapolis, IN (US); Kevin Romsey, Gilbert, IA (US)

(73) Assignee: Buckaroos, Inc., Indianapolis, IN (US)

( * ) Notice: Subject to any disclaimer, the term of this patent is extended or adjusted under 35 U.S.C. 154(b) by 0 days.

(21) Appl. No.: 15/070,858

(22) Filed: Mar. 15, 2016

(65) Prior Publication Data
US 2016/0273679 A1 Sep. 22, 2016

Related U.S. Application Data

(60) Provisional application No. 62/135,517, filed on Mar. 19, 2015.

(51) Int. Cl.
F16L 3/12 (2006.01)
B21D 5/00 (2006.01)
F16L 59/135 (2006.01)
B21D 5/01 (2006.01)
B21D 53/00 (2006.01)
F16L 3/133 (2006.01)
B21D 17/02 (2006.01)

(52) U.S. Cl.
CPC ............... *B21D 5/00* (2013.01); *B21D 5/01* (2013.01); *B21D 53/00* (2013.01); *F16L 3/133* (2013.01); *F16L 59/135* (2013.01); *B21D 17/02* (2013.01)

(58) Field of Classification Search
CPC ......... F16L 3/1008; F16L 3/11; F16L 59/135; F16L 3/14; F16L 3/16; F16L 3/02
USPC ............... 138/107, 106, 110; 248/58, 62
See application file for complete search history.

(56) References Cited

U.S. PATENT DOCUMENTS

| 4,323,088 A * | 4/1982 | McClellan | F16L 59/135 138/106 |
| 6,691,742 B1 * | 2/2004 | Cooper | F16L 3/14 138/106 |
| 7,677,505 B2 * | 3/2010 | Deichman | F16L 3/1008 138/106 |
| 8,038,105 B2 * | 10/2011 | Deichman | F16L 3/1008 138/106 |
| 8,087,431 B2 * | 1/2012 | Souza | F16L 3/02 138/103 |
| 8,763,960 B1 * | 7/2014 | Moore | F16L 3/133 174/40 R |
| 8,915,110 B1 * | 12/2014 | Moore | F16L 3/133 72/131 |

(Continued)

OTHER PUBLICATIONS

Website Page http://products.buckaroos.com/viewitems/sliding-saddle-systems, Dated Mar. 3, 2015.

*Primary Examiner* — Patrick F Brinson
(74) *Attorney, Agent, or Firm* — Woodard, Emhardt, Moriarty, McNett & Henry LLP

(57) ABSTRACT

Certain embodiments of the present invention relate to arcuate saddles typically used to anchor and suspend insulated or non-insulated pipes. One or more adhesive strips are mounted to the interior, concave surface of the saddles. In preferred embodiments the adhesive strips extend transverse to or parallel to the longitudinal axis of the saddles. Certain embodiments of the present invention involve methods of manufacturing arcuate saddles with adhesive strips.

15 Claims, 22 Drawing Sheets

(56) References Cited

U.S. PATENT DOCUMENTS 9,360,139 B1 * 6/2016 Clement ................ F16L 13/10

* cited by examiner

ARCUATE SADDLES WITH ADHESIVE STRIPS

FIELD OF THE INVENTION

Aspects of the present invention relate generally to saddles for anchoring and supporting insulated and uninsulated pipes.

BACKGROUND OF THE INVENTION

Components which are commonly known as "saddles" are used in building construction to anchor and support pipes to suspend the pipes from the structure of the building. Saddles spread the force of a hanger across a portion of the pipe to minimize the force applied to a particular location. Saddles are typically attached to the ceiling above the supported piping by straps, clevis hangers, roller hangers, trapeze hangers, or strut type support systems.

SUMMARY

Certain embodiments of the present invention relate to arcuate saddles typically used to anchor and suspend insulated or non-insulated pipes. It has been determined that it is useful in certain situations to attach the saddles directly to the supported piping. Certain embodiments of the present invention involve methods of providing one or more adhesive strips secured to the interior of the arcuate saddles, and to the resulting saddles.

In certain embodiments, a method is provided for forming arcuate saddles from a length of material by first preparing a flat saddle blank and securing an adhesive strip to the blank. The arcuate saddle is then formed from the blank. The resulting saddles have a transversely mounted adhesive strip on the interior, concave surface. Methods of making the saddles are also contemplated by the present invention.

Objects, features and advantages of the present invention shall become apparent from the detailed drawings and descriptions provided herein.

DESCRIPTION OF PREFERRED EMBODIMENTS

For the purposes of promoting an understanding of the principles of the disclosure, reference will now be made to the embodiments illustrated and specific language will be used to describe the same. It will nevertheless be understood that no limitation of the scope is thereby intended, such alterations, modifications, and further applications of the principles of the disclosure being contemplated as would normally occur to one skilled in the relevant art.

The present invention provides a method for forming an arcuate saddle having an adhesive strip mounted on the concave surface of the saddle extending transversely of the longitudinal axis of the saddle. In the preferred embodiment, a continuous length of double-sided adhesive tape is applied to a continuous length of saddle material. The combined adhesive tape and sheet material is then cut into saddle blanks and thereafter formed into arcuate saddles having the adhesive tape located on the concave surface. The invention encompasses a variety of methods for forming the arcuate saddles, including stamping and rolling.

Figure 1:
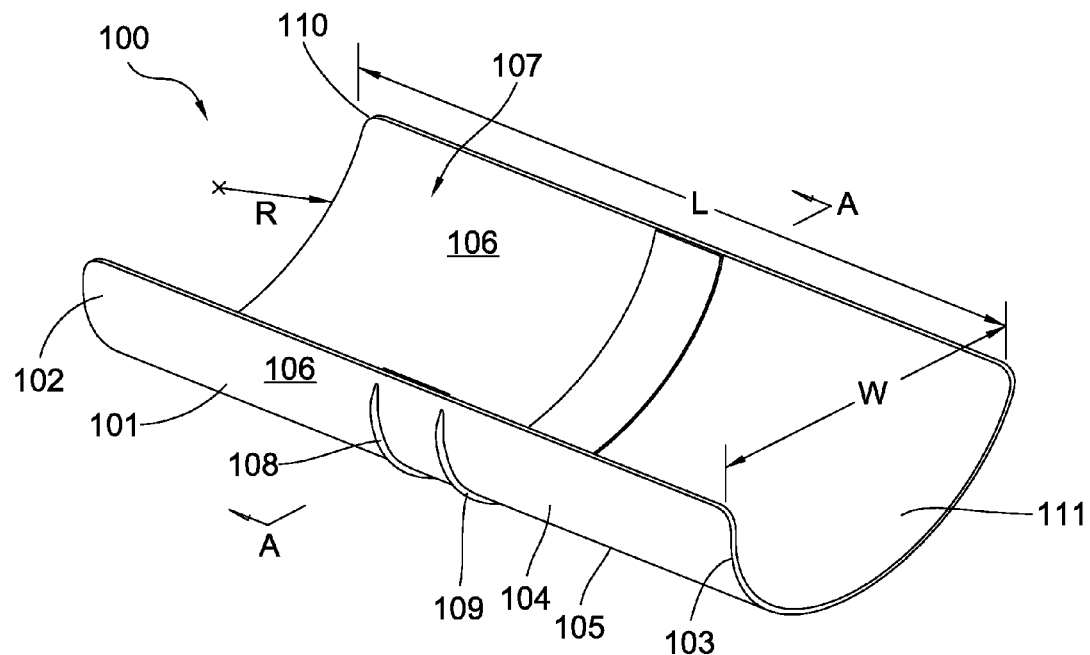
FIG. 1 is a perspective view of an arcuate saddle according to an embodiment of the invention.
Figure 2:
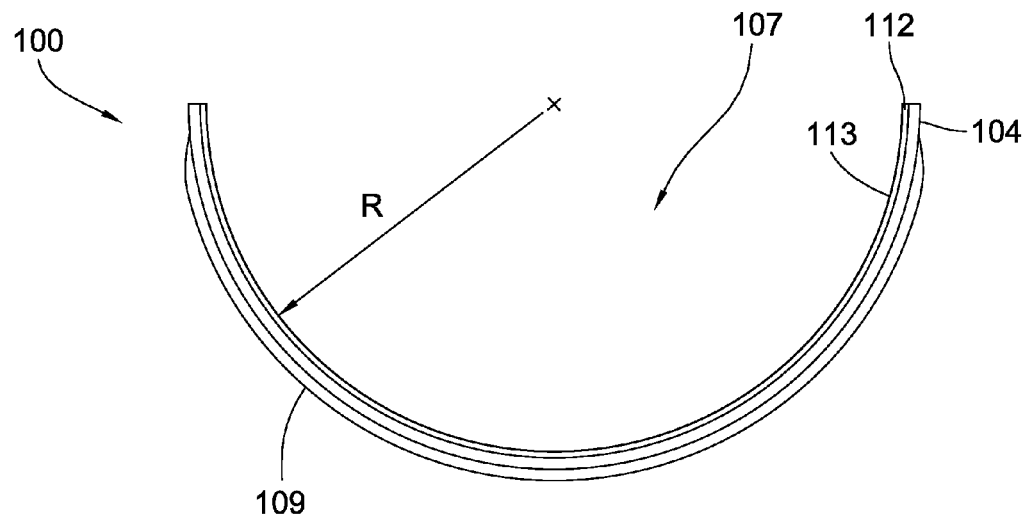
FIG. 2 is an end view of the saddle of FIG. 1.
Figure 3:
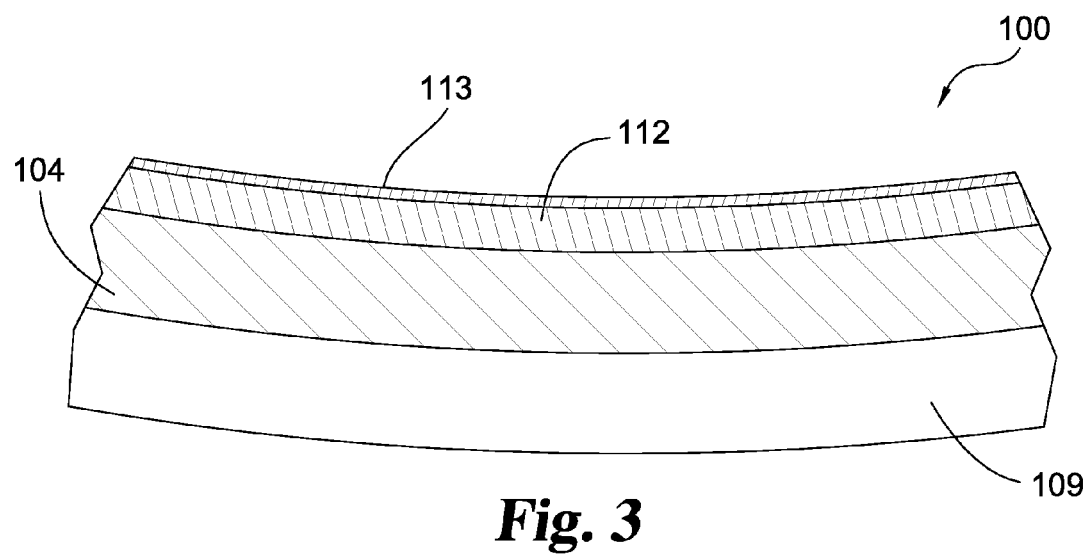
FIG. 3 is a cross-sectional view of the saddle taken along the line A-A in FIG. 1.

Referring to FIGS. 1-3, there is shown a saddle 100 having a length L and a width W. Saddle 100 is formed from a rectangular blank of sheet metal 101 pressed or rolled into approximately a 180° arcuate bend about a radius R. Saddle 100 includes two ends 102 and 103 at opposing ends of the saddle length. Ends 102 and 103 are optionally slightly outwardly flared (not shown) to facilitate introduction of the pipe into the saddle and to minimize any abutment of sharp edges against the pipe or insulation. The exterior face 104 of saddle 100 includes a generally lower portion or lower face 105 and opposing vertical sides 106. "Vertical" and "lower" references herein refer to arcuate or curved portions of the saddle which may include generally vertical or horizontal tangents and are not intended to imply planar or flat portions.

An interior channel 107 extends through the interior of saddle 100 along the longitudinal axis of the saddle. In use, the interior diameter or width W of channel 107 is sized to receive and engage an outer diameter of a corresponding pipe or insulated pipe to be contacted and supported. As examples, pipe and/or insulation sizes may range from 0.5 to 24 inches. More typical saddle sizes have diameters of 1.5 to 12 inches, optionally available in half-inch increments, although other diameter sizes can be made as desired. Example lengths are 8 or 12 inches.

Also shown is a pair of ribs 108 and 109. Such ribs are optional, but are useful in providing strength to resist changes in the curve of the saddle. Ribs may be full 180° ribs as shown, or may alternatively be partial ribs that do not extend fully to the edges of the saddle. The ribs are generally transverse to the length L of saddle 30 and parallel to the width W. The ribs are also formed to extend a sufficient height and width to inhibit saddle 100 from moving relative to a hanging bracket (not shown) once installed. When partial ribs are used, the partial ribs are preferably primarily oriented on lower face and do not substantially extend along the side portions. In certain preferred embodiments, the arcuate bend of the partial ribs is approximately 60° or less. The saddle is also shown as having rounded corners 110.

Positioned on the interior, concave surface 111 of the saddle 100 is an adhesive strip 112 extending transverse of the longitudinal axis of the interior channel 107 of saddle 100. The adhesive strip 112 includes a release liner 113 which is removed prior to installing the saddle.

The adhesive strip is preferably applied to the saddle blank before forming the arcuate saddle from the blank. As diagrammatically shown in FIG. 4, for example, the adhesive strip may be laminated in the form of a double sided tape onto a continuous length of sheet material 114. The sheet material is supplied from a roll 115 to the tape applicator 116. The tape applicator may be any machine suitable for applying the adhesive strip, and in the case of an adhesive tape the applicator may, for example be a Straub model T-653-2.

A double-sided adhesive tape 117 is supplied to the applicator 116 from roll 118. In the preferred embodiment, the tape 117 has a release liner only on the side facing away from the sheet metal. However, a second release liner may be included on the opposite face of the tape prior to attachment to the sheet material, in which case as the tape is directed against the sheet material, the release liner 119 is removed onto take-up roll 120. The tape is pressed against the sheet material and exits the applicator. The combined sheet material and adhesive tape (with a cover release liner) is then transferred for formation of the saddle blanks and then formed into the arcuate saddles.

The sheet material may be any type suitable for supporting a pipe. As used herein, the term "pipe" or "piping" refers to any type of tubular conduit which is suspended from a surface positioned above the conduit. This includes piping of any type of material, and further includes pipes covered with other materials such as insulation. Saddles are commonly formed from sheet metal, e.g., steel, stainless steel, aluminum, etc. However, plastic or other materials which may be formed into arcuate saddles from flat saddle blanks may also be used.

The term "adhesive strip" refers to a length of adhesive applied to the saddle blank. The strip may have any width which provides sufficient adhesive to secure the saddle to a supported pipe. One or more adhesive strips may be used, although one is usually sufficient, and is therefore preferred. If a single strip is used, it is preferably centered along the length of the saddle. If multiple adhesive strips are used, they are preferably spaced in balanced positions along the length of the saddle, e.g., equidistant from the ends or uniformly spaced along the length. The adhesive strips are covered by a releasable cover material that is removed prior to use.

Figure 4:
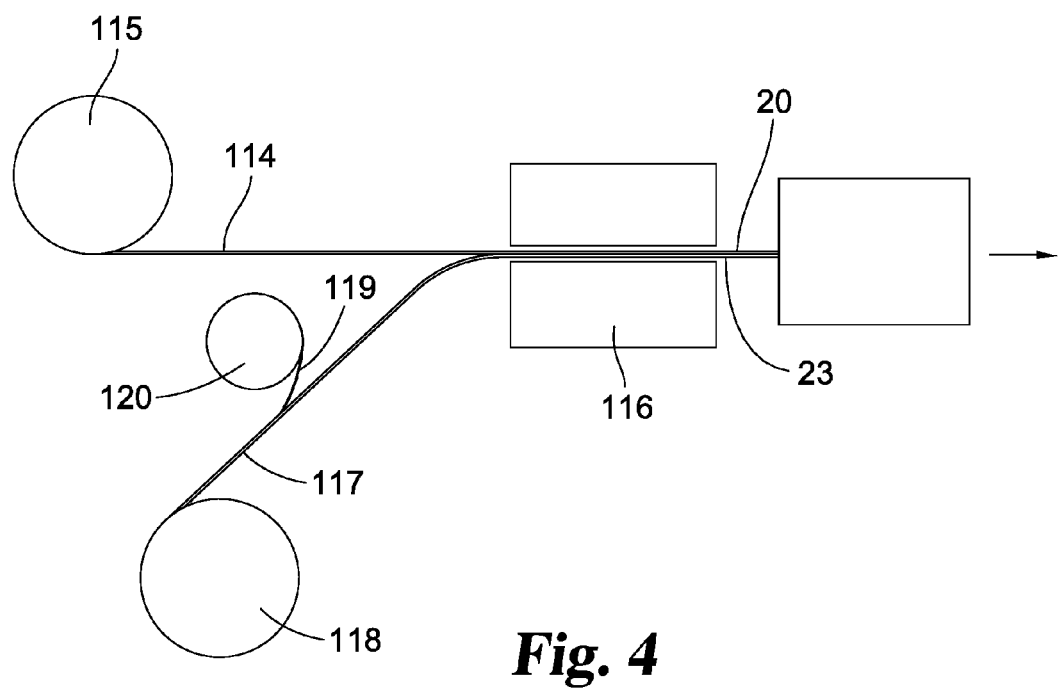
FIG. 4 is a diagrammatic representation of a system for applying a double-sided adhesive tape to a saddle blank.

Shown in FIG. 4 is the application of a double-sided adhesive tape. This approach has several advantages. For example, the double-sided tape is readily applied to the sheet arterial and provides for easily determined widths and thicknesses. It also includes the covering release liner on the exposed side, which is conveniently removed prior to installation of the saddle. In the alternative, it will be appreciated that other approaches may be used to provide the adhesive strip to the sheet material prior to forming the blank. For example, the adhesive could be directly applied to the sheet material such as by spraying, rolling, printing or other techniques known to those skilled in the art. The release liner could then be subsequently added over the adhesive.

The adhesive strip is preferably applied as a continuous length of adhesive. However, the adhesive strip could optionally be formed as a discontinuous length of adhesive, e.g., intermittent strips with either a continuous or discontinuous release cover. The adhesive strips preferably extend fully from edge to edge of the saddle. This is readily accomplished by applying a continuous adhesive tape (or by other striping means) to the sheet metal and cutting the tape during formation of the saddle blank. However, embodiments with adhesive strips extending less than fully edge to edge could be prepared, such as by applying discontinuous segments of adhesive to the sheet material.

The combined saddle material and adhered adhesive strip is then processed into an arcuate saddle. This may be accomplished in any manner, as well known in the art. Examples of suitable processes are disclosed, for example in U.S. patent application Ser. No. 14/289,752, entitled Arcuate Saddles with Rounded Corners, filed on May 29, 2014.

The continuous sheet material is formed into saddle blanks which are then bent into the arcuately formed saddles. A blank is typically a flat, rectangular sheet with a length corresponding to the desired length of the saddle and a width corresponding to the desired circumference of the saddle around the desired radius. The length forms two parallel length sides which are perpendicular to two parallel width sides. The blank carrying the tape strip is then formed into an arcuate shape, for example using a stamping or rolling process.

In one approach, the flat saddle blank and adhesive strip is automatically fed or manually transferred to a stamping machine. The blank is arranged between a protruding male portion and receiving female portion formed in complementary arcuate shapes. When the stamping machine is compressed, the portions bend the blank into an arcuate saddle shape. Optionally, the stamping machine portions may also include protruding 180 degree or partial ribs which stamp corresponding rib sections into the saddle during the same step.

Figure 5:
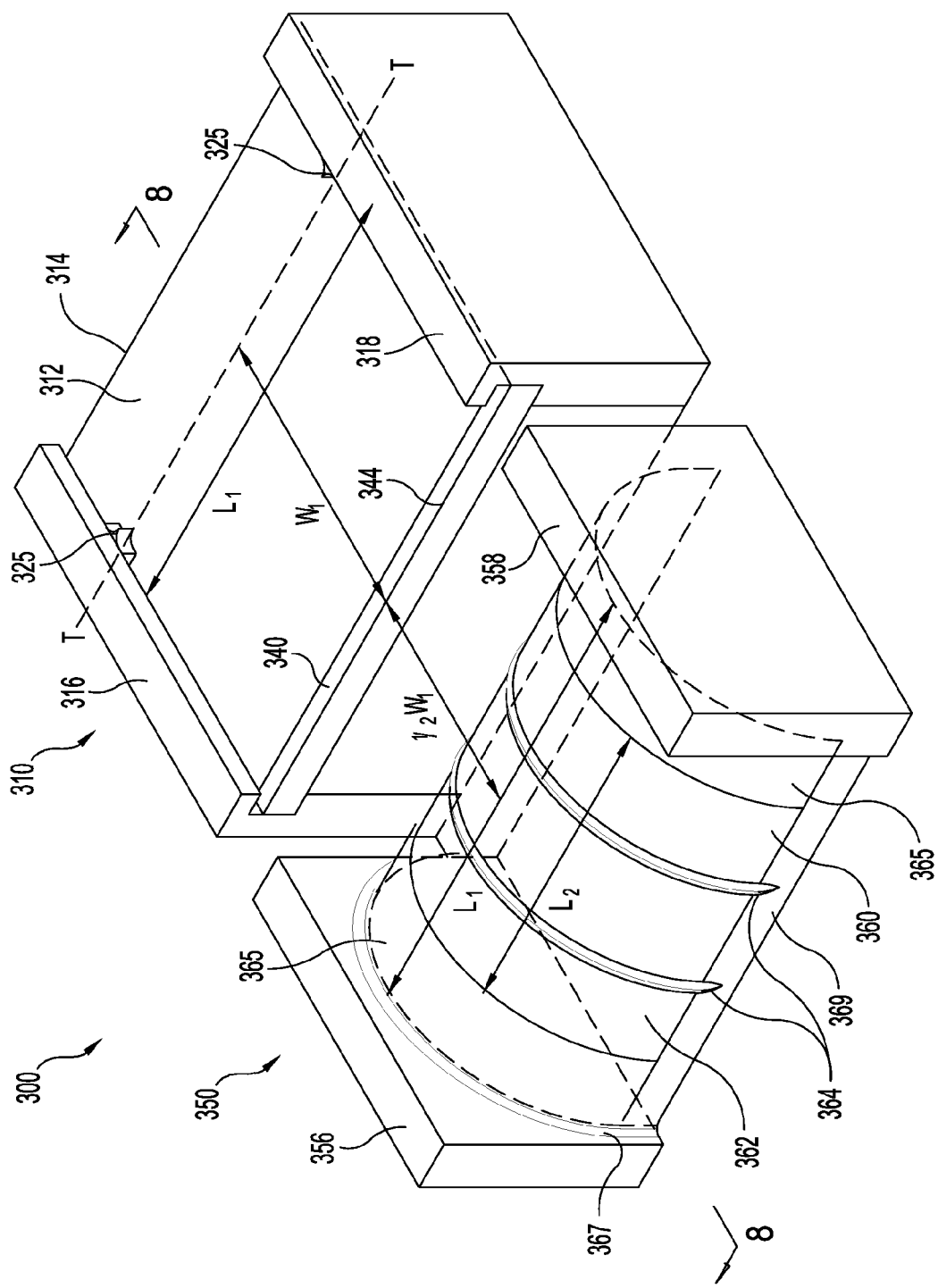
FIG. 5 is a perspective view of the lower portion of a progressive die arrangement for stamping arcuate saddles according to certain embodiments of the present invention.
Figure 6:
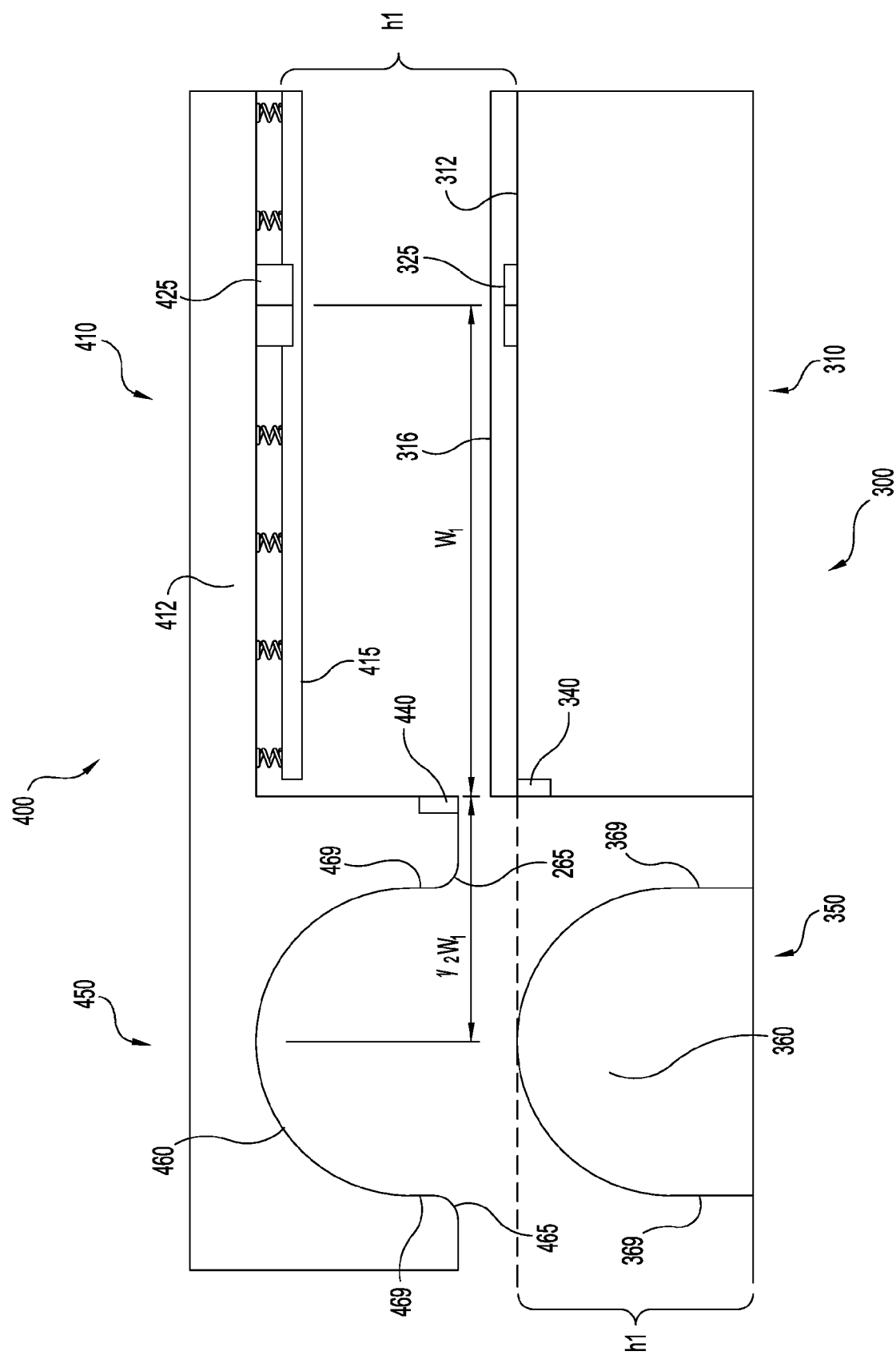
FIG. 6 is a cross-sectional view of the upper and lower portions of the progressive die arrangement of FIG. 5.

An example embodiment of a stamping machine and process is illustrated in FIGS. 5 and 6. FIGS. 5 and 6 show an example of a progressive die having a lower die portion 300 and an upper die portion 400. Lower die portion 300 includes a cutting portion 310 and a bending portion 350. Upper die 400 includes a corresponding cutting portion 410 and bending portion 450.

As illustrated in detail in FIG. 5, cutting portion 310 of lower die 300 includes a bed portion 312 with an entry edge 314, an upper edge 316 and a lower edge 318. An exit edge 344 of the bed is formed with a replaceable cutting bar 340 mounted along the edge opposite entry edge 314.

Cutting pieces or punches 325 are mounted in bed 312. Cutting pieces 325 are preferably formed with two concave radius portions extending from each side of the cutting piece inward toward the center of the bed to an inner tip. The tips of the two cutting pieces are preferably aligned along a trim axis T-T. Optionally, cutting pieces 325 are selectively mountable in various locations relative to bed 312 to vary the width distance $W_1$ between axis T-T and the cutting edge 344 of bar 340 in certain preselected measurements. Optionally, cutting pieces 325 may also be mounted to bed 312 along the upper and lower edges forming side rails 316 and 318 as shown, or each may be moved inward along the length axis $L_1$ of bed 312 to engage a correspondingly shorter length of material. The length of dimension $L_1$ is intended to correspond to the desired length of the finished saddle piece, for example saddle lengths of 8 or 12 inches. The length dimension $L_1$ may correspond to the width measurement from the perspective of a metal strip or ribbon being supplied to die portion 300, such as from a steel coil.

In correspondence with cutting portion 310 of lower die 300, cutting portion 410 of upper die 400 is arranged with a cutting bed portion arranged to mate with lower bed 312. Cutting or pierce punch pieces 425 which are complimentary in shape to cutting pieces 325 are mounted to upper portion 412. As shown, cutting pieces 425 include two convex radius portions extending from outer edges inward towards the center of the bed to meet at a tip. Cutting portions 325 and 425 are preferably substantially equal in complimentary shapes with a slight tolerance difference in size so that upon compression of the die, a lower cutting portion 325 pushes upward on a piece of metal in the die a while upper cutting portion 425 pushes downward on the metal creating a shearing effect to cut a plug of material from the metal, leaving a shape in the metal matching the radius portions where the upper and lower cutting punches pass.

In an optional feature, upper bed 412 may include a compression plate 415 mounted on springs. When used, the compression plate typically would be the first portion of the upper cutting portion 412 to contact the metal material in the die and would provide a clamping force on the metal between the plate and lower bed 312 to hold the metal in place while the upper die continues its downward stroke. As the downward stroke continues, the springs compress to resiliently increase the clamping pressure on the metal in the die until the cutting portions have finished a cutting downward stroke. The clamping pressure releases and retracts as the upper die 400 moves in the reverse stroke.

Lower die 300 further includes bending portion 350 arranged to receive material exiting cutting portion 310. Bending portion 350 includes a radiused male portion 360 forming a radius and diameter corresponding to the desired inner arcuate radius and curve of the saddle. The radius may extend for approximately 180°, or optionally may include a slight variation or be slightly oversized to accommodate expected spring back of the metal material being bent.

Male radius 360 typically includes a radiused face portion 362 forming a central portion of the bending surface. Optionally arranged on opposing sides of the center of central portion 362 are partial or full ribs 364 to press corresponding partial or 180° ribs into the metal blank being bent. The face of radius 360 preferably includes slightly tapered flared portions 367 at each end to impart a flare to the upper and lower edges of the blank being bent.

In certain embodiments, the face of radius 360 includes radiused sections 365 arranged outward along the length $L_1$ between upper edge 356 and lower edge 358 of bending portion 350.

Optionally, the face of bending portion 350 can be arranged to accommodate a narrower blank corresponding to an arrangement where cutting portions 325 are spaced inward from upper edge 316 and lower edge 318 of bed 312. For example, this can be used with a strip of metal having a length $L_2$ such as eight inches. In this arrangement, spacer plates (not shown) are placed over the outward radiused sections 365 so that a centered metal blank is fed between them in the area designated $L_2$. The spacer plates optionally include flared portions along their central edges so that a blank bent in the $L_2$ region receives flared outer edges. The spacer plates preferably include radii to correspondingly fit snugly on radiused portions 365 when in place without interfering with compression of the die. The spacer plates may be mounted by resting in place or may optionally be secured with fasteners.

Upper die 400 has an upper bending portion 450 matching and complementary to lower bending portion 350. As illustrated in a cross-section in FIG. 8, bending portion 450 includes a cutting bar 440, preferably replaceable, which forms a shearing relationship with lower cutting bar 340 to cut material in the die as the die compresses.

Bending portion 450 includes a concave female radius 460 complementary to male radius 360. Female radius 460 may optionally include indentations or grooves allowing for partial or full ribs 364 to press ribs into the metal being bent. In some embodiments, male radius 360 and female radius 460 each include slight vertical wall sections 369 and 469 transitioned from the arcuate radius portions to allow the male and female portions to compress sufficiently to impart a full 180° radius to the metal being bent.

Preferably, the center of male bending portion 350 is spaced from the shear or cutting edge 344 of cutting bar 340 at a distance of $\frac{1}{2}W_1$. The spacing corresponds to half of the distance $W_1$ between the punch 325 cutting tips along trim axis T-T and the shear edge 344.

In operation of the illustrated progressive die, a ribbon or strip of metal, having a continuous strip of adhesive extending lengthwise along the underside of the metal, is fed into bed portion 312 from the direction of entry edge 314. The strip or ribbon of metal may have a width corresponding to the desired length of the saddle to be made, for example filling length distance $L_1$ of bed 312. The thickness of the metal is preferably of a gauge designed to be cut by the height of punch pieces 325 and 425. Prior to the introduction of the metal, cutting punches 325 and 425 are arranged at a distance $W_1$ from shearing edge 344 of cutting bar 340 where distance $W_1$ corresponds to the desired blank to be cut with a width to be formed into the desired circumference measurement of the saddle piece to be produced.

In a loading step, the leading edge of the metal with two rounded corners is advanced into bed 312 until the forward edge is adjacent the shear edge of cutting bar 340. Optionally, the metal may be advanced further or less; however, a scrap portion will need to be cut and discarded in the first cycle or two of the die to create a leading edge with two rounded corners.

In a first cycle of operation, the male and female die portions compress to shear off any excess material extending beyond cutting bar 340 and also to punch radiused convex indentations along axis T-T into the metal material. Upon completion of the first compression and release cycle, the metal strip is advanced a distance $W_1$ through the die. In the next position, the portion of the metal in which the radiused indentations were made along axis T-T is aligned with the shearing edge of cutting bar 340 with the forward portion of the metal extending between the bending portions of the respective dies. Upon the next compression cycle, cutting bars 340 and 440 shear the material along axis T-T leaving a blank to be bent in the bending portions of the dies while also punching the next radiused indentations with punches 325 and 425 into the metal of material. Each compression and cutting cycle by punches 325 and 425 forms two rounded corners on one side of axis T-T and two rounded corners on the opposite side of axis T-T. When the metal is cut along axis T-T, these form rounded trailing corners of a prior blank and rounded leading corners on the edge of the next blank.

As the die closes in the second and successive iterations, the upper point of male radius 360 and the lower portions of upper bending portion 450 contact and hold the metal piece between them in a three point contact grasp. As the metal is cut and the dies continue to compress, the metal is bent around male radius 360 until the desired bend arc has been imparted to the blank. Typically the cutting portions and bending portions simultaneously compress and retract the same distance $h_1$ during a cycle.

During compression bending, the outer portions of the blank are pushed downward and slightly drawn inward to wrap around the male radius 360. The lower edges of the female radius 460 preferably include a slight radius or taper 465 to facilitate the metal being bent rather than scraped as the female radius is forced downward to wrap the metal.

Upon completion of the compression cycle, the die portions are separated and the formed arcuate saddle may be removed from lower bending portion 350. The metal strip or ribbon is then advanced a distance $W_1$ to provide the next portion of material to be cut off and bent in the bending portions and the next portion of material to be cut with indentations in the cutting portions of the die. The operation may then be repeated as desired to form multiple arcuate saddles with rounded corners.

In certain optional embodiments, the female bending portion 450 may include one or more retractable compression pins to contact the metal blank during the compression portion of the cycle. The pin or pins preferably push the saddle out to prevent it from sticking within the female bending portion during the upward stroke.

In certain optional embodiments, an embossing die may be arranged in the cutting or bending portions of the arrangement to emboss indicia such as size information or a brand name or logo into the inner or outer faces of the saddle being formed.

In one embodiment, the cutting portions and bending portions are mounted in a fixed distance relationship defined so that the distance between shear edge 344 and the center of bending portion 350 is one-half of the distance between the shearing edge 344 and the trim axis T-T. Alternately, the distance between the cutting portions and the bending portions can be varied at predefined intervals to maintain the relationship of $W_1$ to $\frac{1}{2}W_1$ as the cutting punches 325 are arranged within bed 312 to accommodate different width measurements W. For example, different width measurements $W_1$, would be used to accommodate the differences in circumference measurements between arcuate saddles of differing radii and diameters. In an alternate embodiment, the bending portion can be arranged to receive a cut blank with rounded portions from the cutting portions and to then automatically center the blank over the desired radius portion.

A further example embodiment of a stamping machine 500 and process is illustrated in FIGS. 7 through 20. FIGS. 7-20 show an example of a progressive die arrangement having a cutting assembly 510, a bending assembly 550 and an ejector assembly 590.

Figure 7:
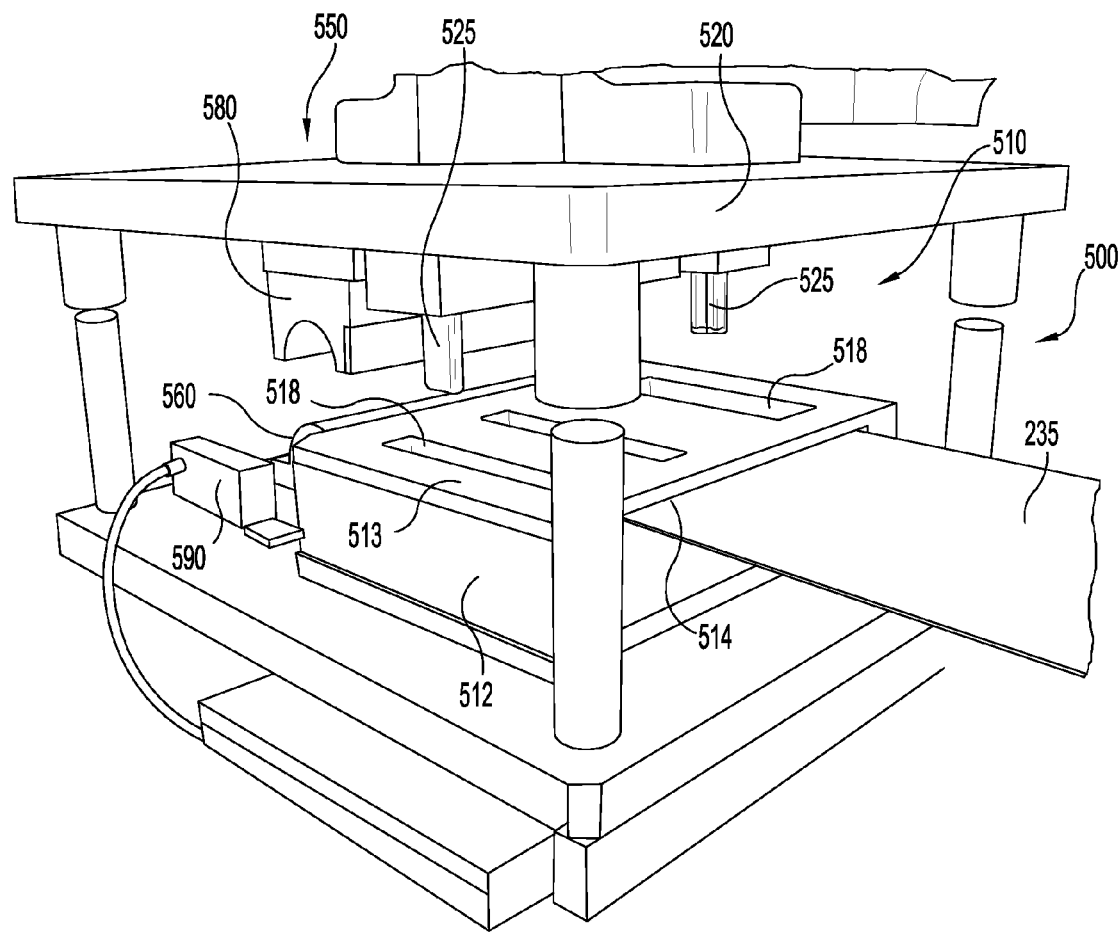
FIGS. 7-9 are perspective views of one embodiment of a progressive die arrangement according to certain embodiments.
Figure 8:
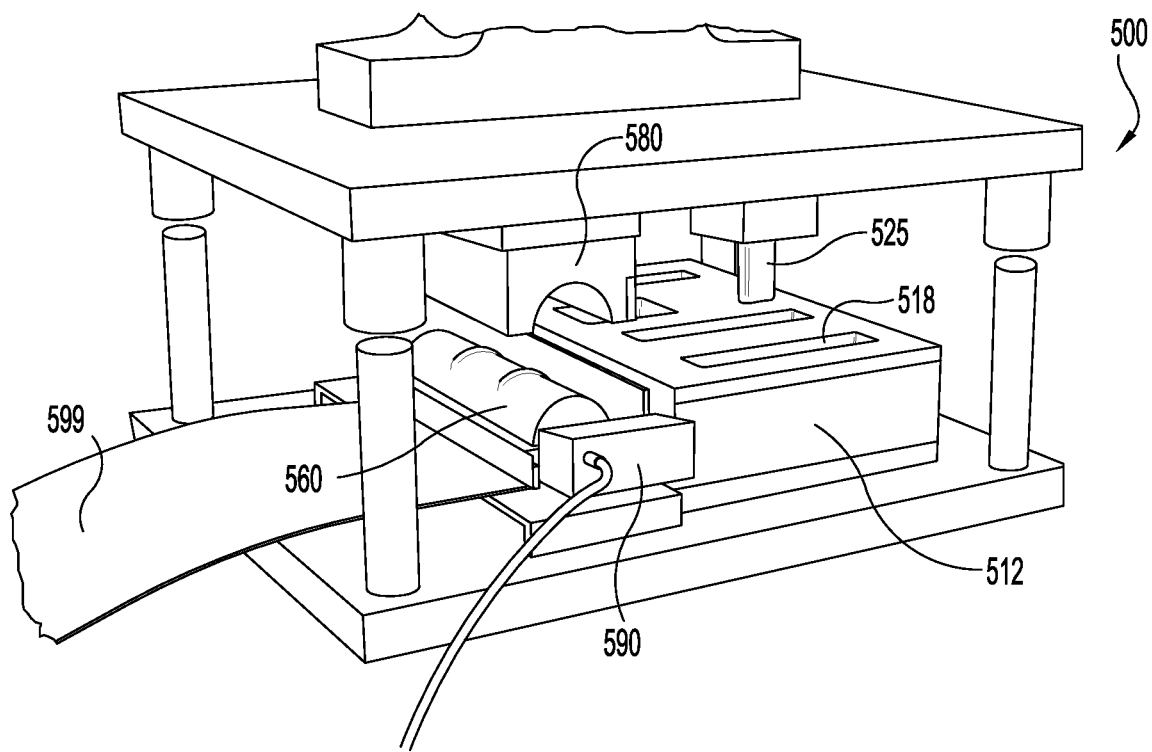
Figure 9:
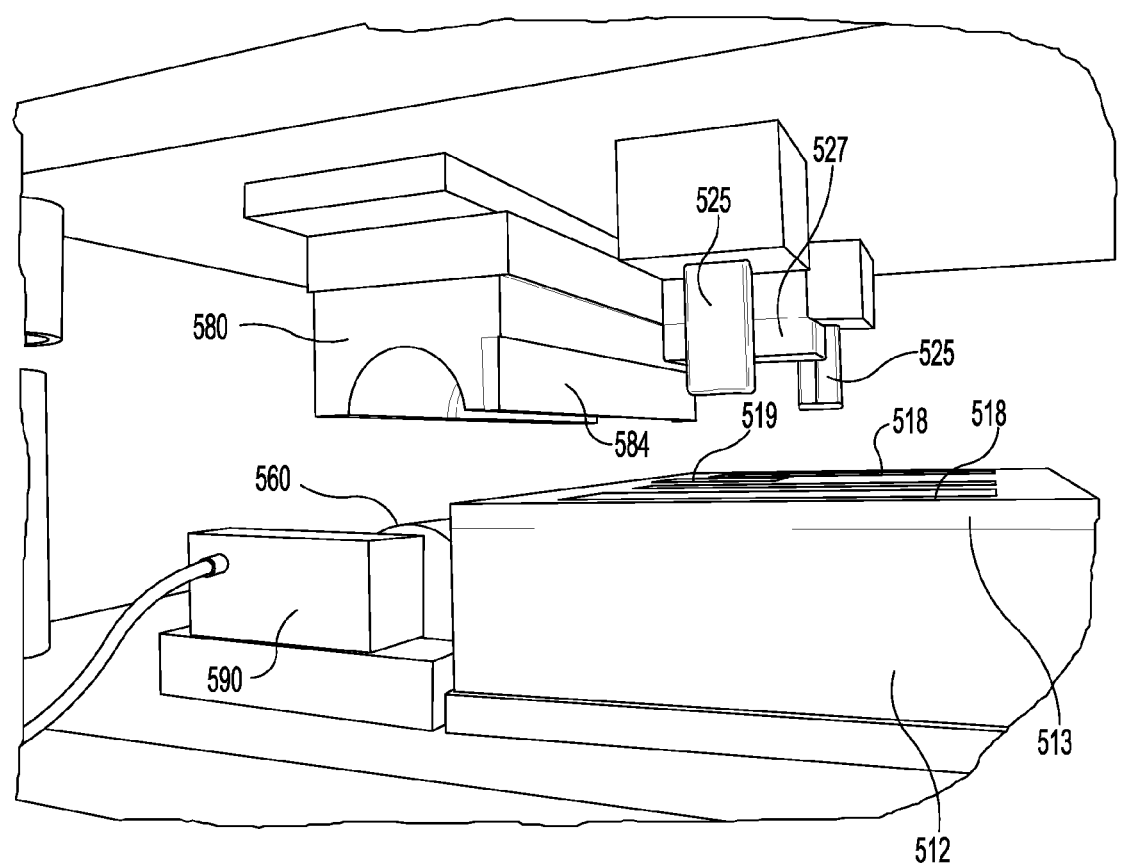
Figure 12:
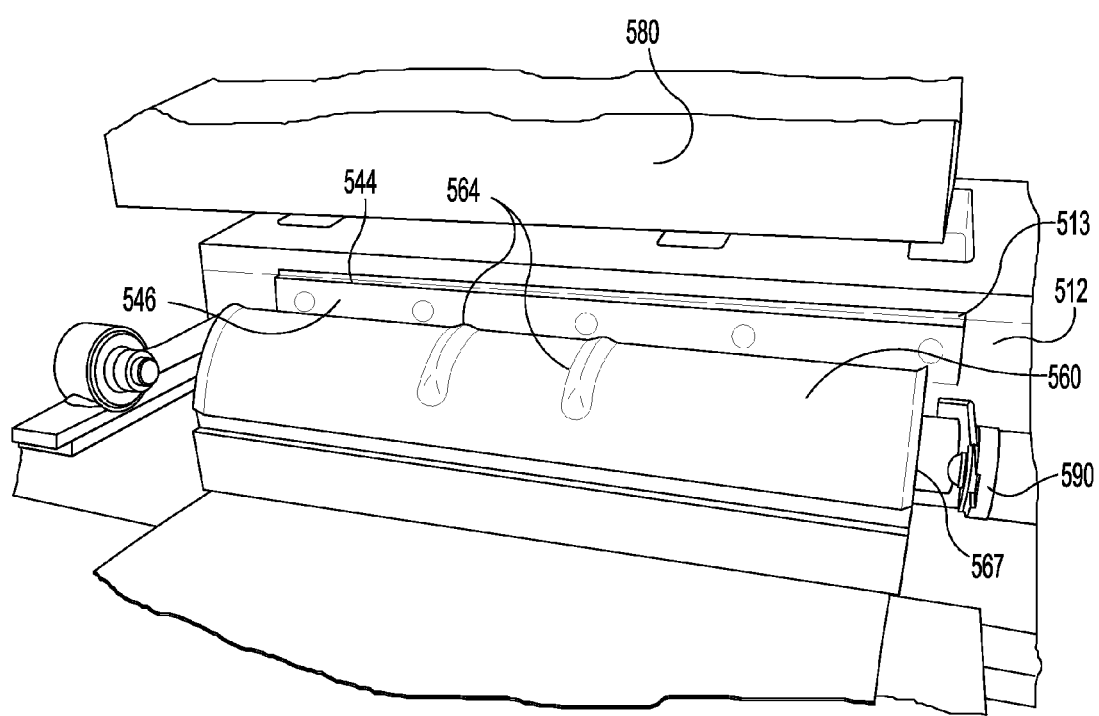
FIGS. 12-14 are perspective views of the bending assembly of FIGS. 7-9.

As illustrated in detail in FIGS. 7-9, cutting assembly 510 includes a lower portion with bed 512. The top of bed 512 is closed with an upper plate 513. Bed 512 includes a bed area with side rails which is covered by plate 513 to define a sheet metal path with entrance 514 sized to receive sheet metal material 235 fed, for example from a coil and advanced by a feeding mechanism. The bed ends in forward or shearing edge 544 (FIG. 12). Upper plate 513 defines vertical edge slots 518 arranged along its longitudinal length and optionally a logo stamping slot 519.

Figure 10:
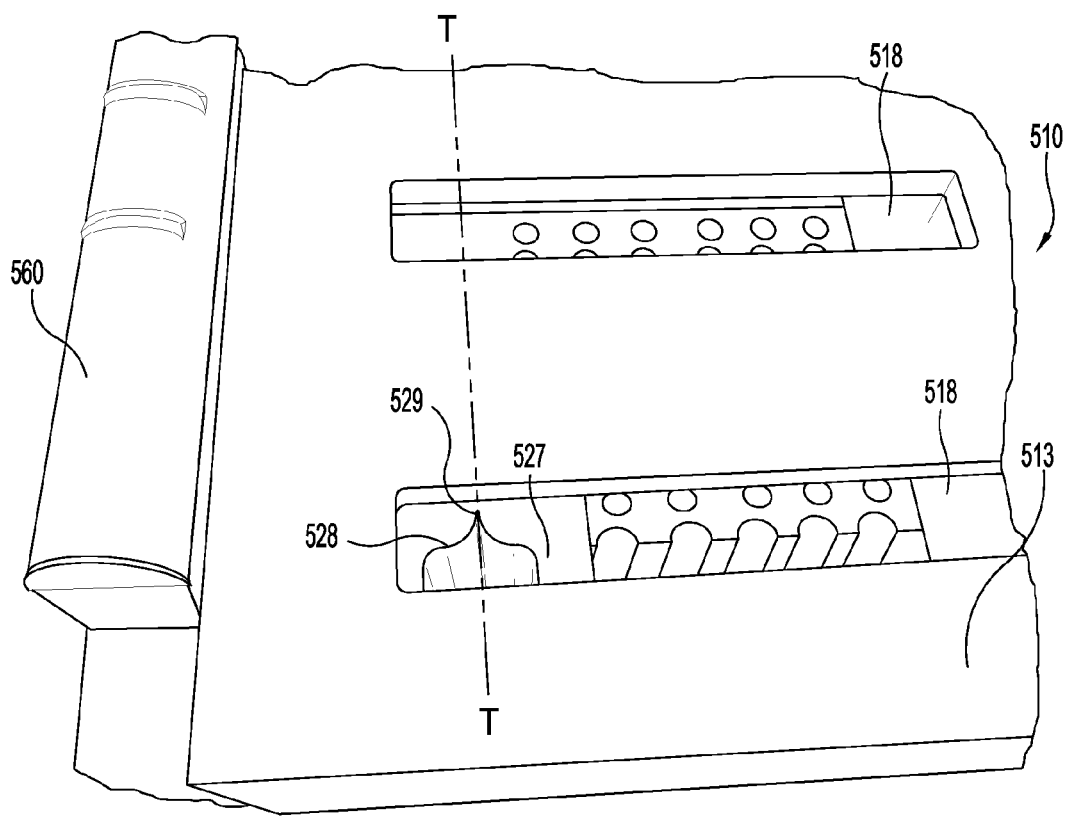
FIGS. 10 and 11 are perspective views of the lower and upper cutting pieces and profiles usable in the embodiments of FIGS. 7-9.

Bed 512 includes two cutting profiles 527, as seen in FIG. 10, aligned with edge slots 518, which are complimentary in shape to and are mated to form a shearing arrangement with the cutting profiles of cutting pieces 525. In the illustrated embodiment, the cutting profiles 527 within bed 512 have two convex radiused portions 528 extending from each side inward toward the center of the bed to a tip 529. The tips of the two cutting profiles are preferably aligned along a trim axis T-T.

Figure 11:
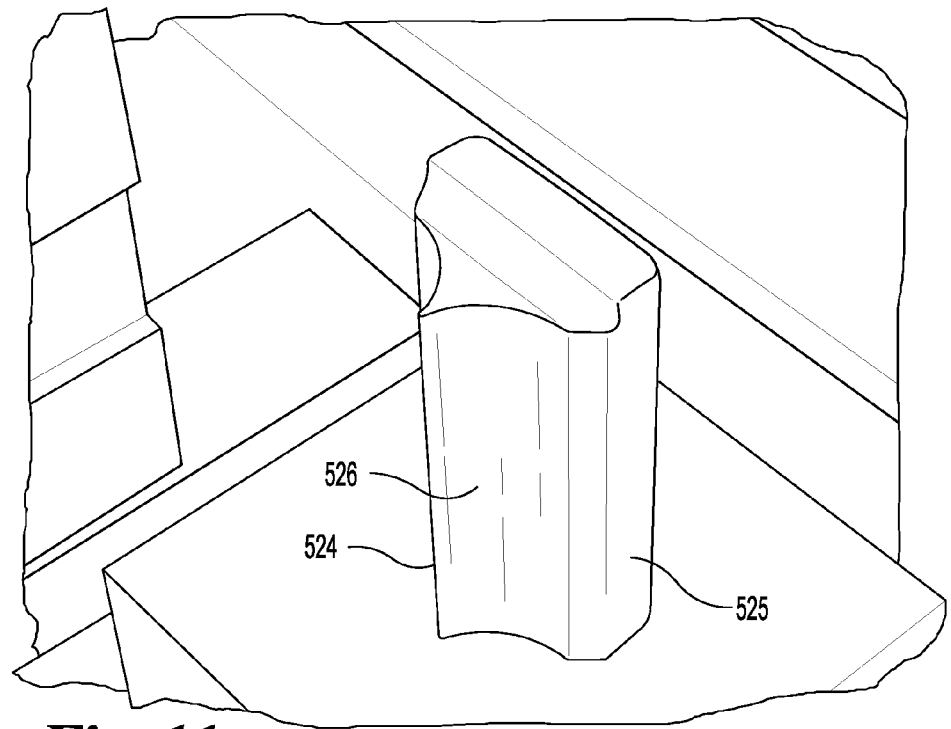

The upper portion of cutting assembly 510 includes an upper carrying plate 520 with cutting pieces or pierce punches 525 extending downward. As seen in FIG. 11, cutting pieces 525 are preferably formed with a cutting profile having two concave radiused portions 526 extending from each side of the cutting piece inward toward the center of the bed to a tip 524.

Cutting pieces 525 of the upper portion are aligned with longitudinal edge slots 518 in plate 513 and with the cutting profiles 527 of bed 512. Cutting pieces 525 and cutting profiles 527 are preferably substantially equal in complimentary shapes with a slight tolerance difference in size so that upon compression of the die, the upper cutting portions push downward on the sheet metal, while the lower cutting profiles resist/push upward, creating a shearing effect to cut a plug of material from the metal, leaving a cutout shape 255 (FIG. 15) in the metal 235 matching the radius portions where the cutting pieces and the cutting profiles pass.

Cutting pieces 525 and cutting profiles 527 are preferably selectively mountable in various locations along the length of edge slots 518 to vary the distance between axis T-T and the forward or cutting edge 544 of bed 512. They optionally may also be mountable along the width of bed 512. For example, two edge slots 518 are illustrated along one side of plate 513. The cutting pieces on that side can be arranged in the inner or outer edge slots to accommodate metal widths corresponding to different lengths for example lengths $L_1$ and $L_2$ as discussed with respect to FIG. 5.

If desired, an optional logo stamping piece 520 may be aligned with an optional logo stamping slot 519. The logo stamping piece may be used to stamp the imprint of graphics or text into the sheet metal to apply a logo, sizing indicia or other information as desired.

Figure 13:
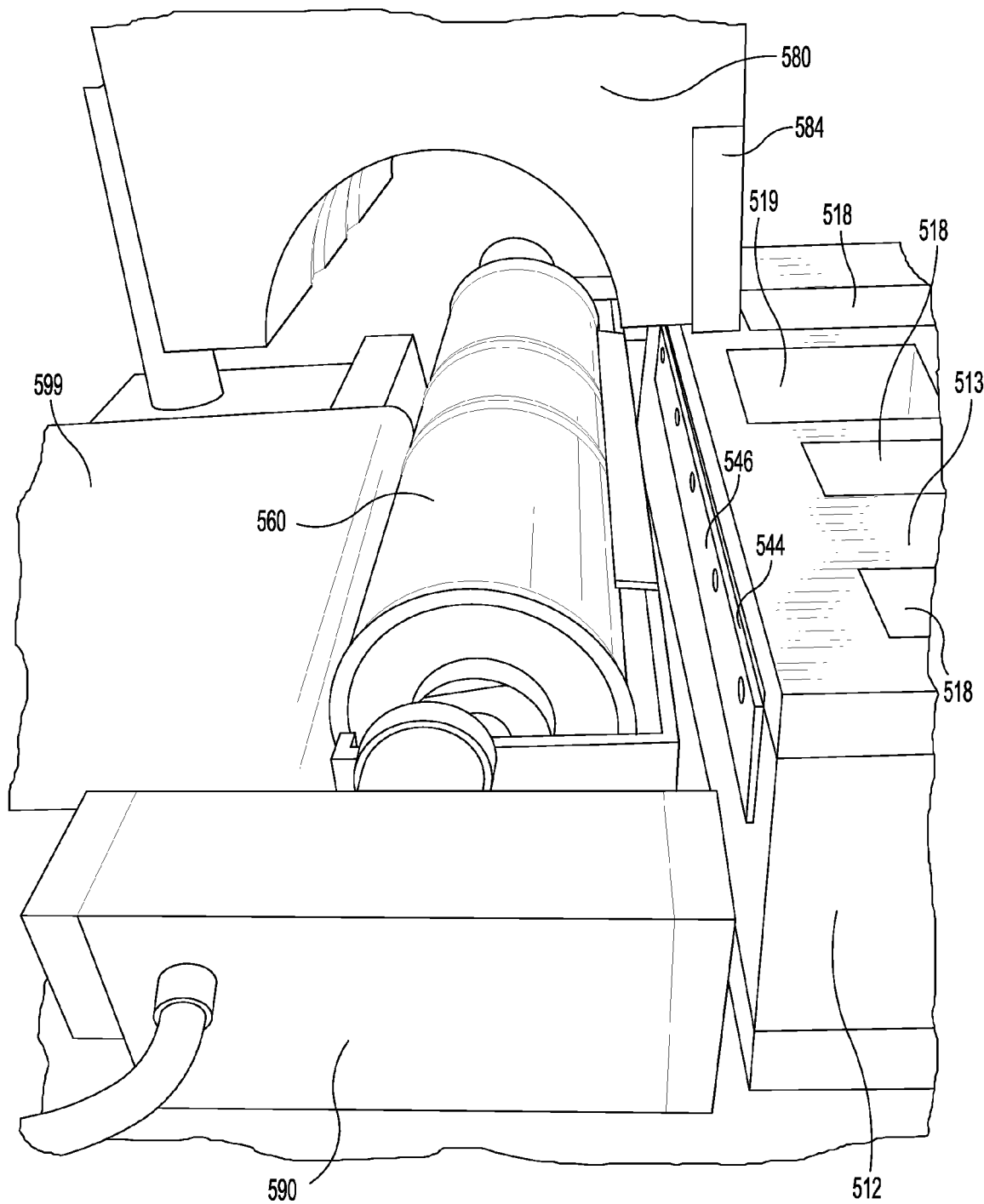
Figure 14:
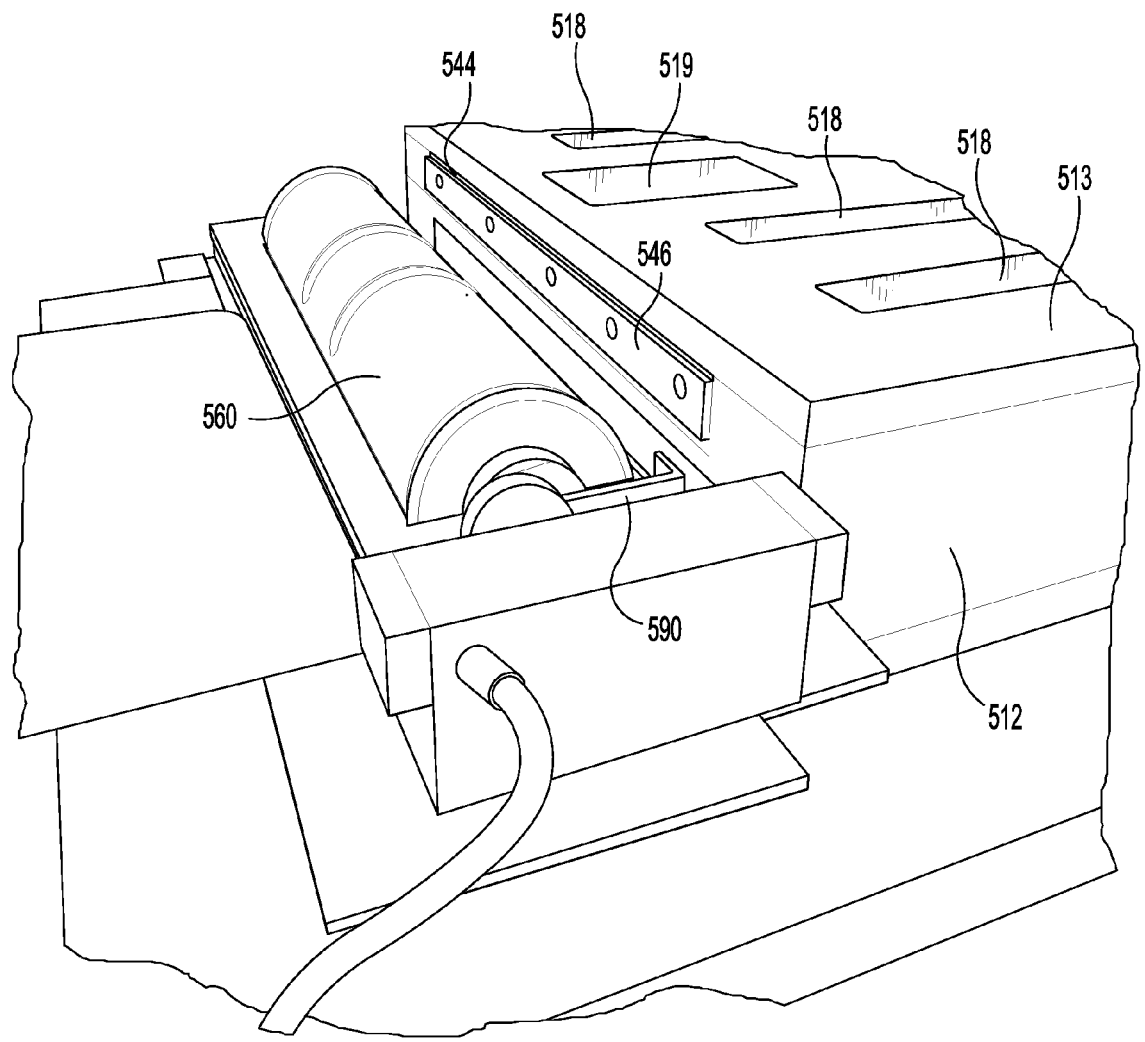
Figure 15:
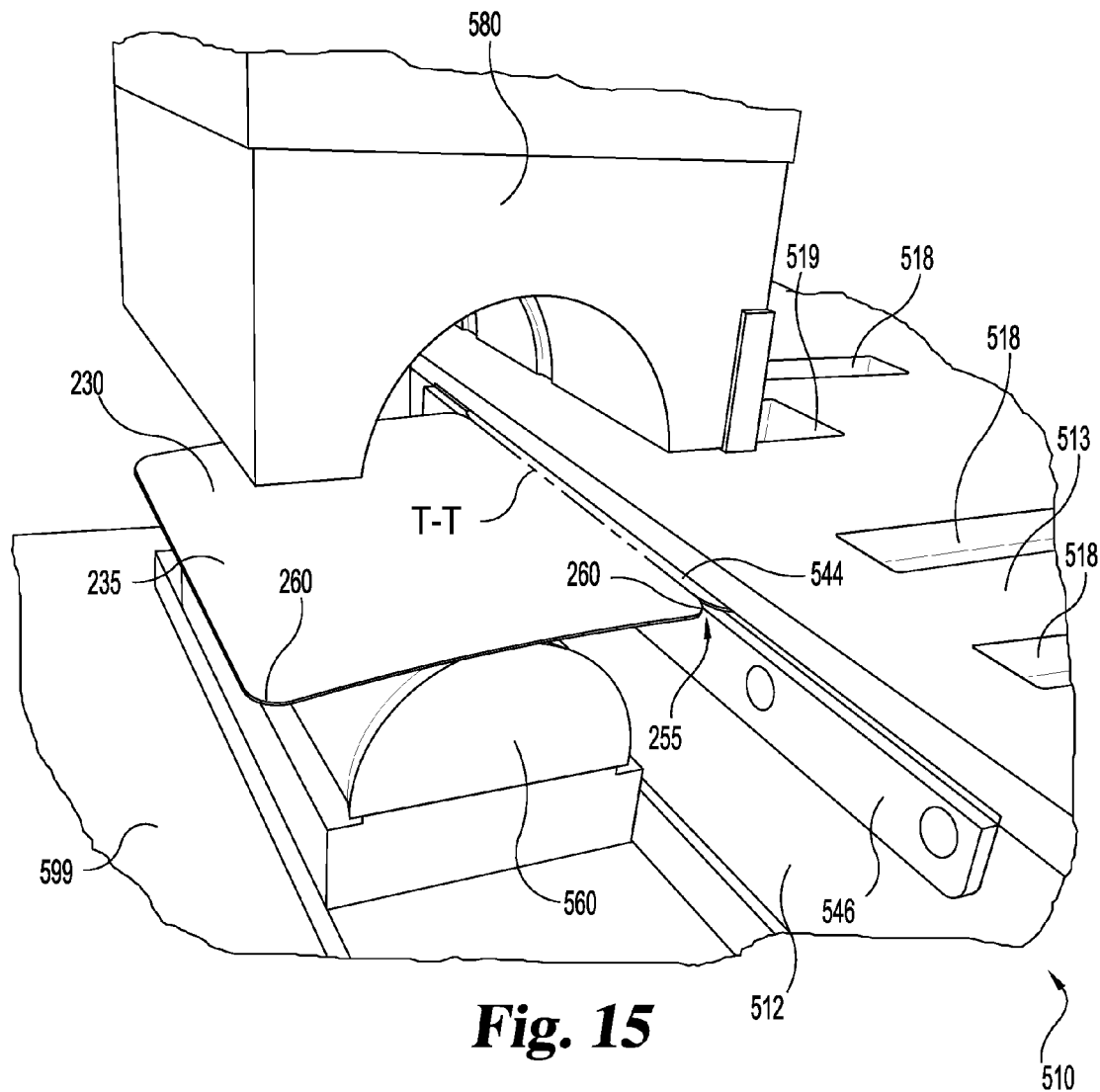
FIGS. 15-18 illustrate operative steps of the arrangement of FIGS. 7-9.

Progressive die arrangement 500 further includes a bending assembly 550 illustrated in detail in FIGS. 12-14. Bending assembly 550 is arranged adjacent the forward edge 544 of cutting assembly 510, to receive sheet metal 235 advanced through bed 512. Bending assembly 550 includes a lower die 560 and an upper die 580. Upper die 580 is mounted on upper carrying plate 520. Upper die 580 includes a cutting bar 584, preferably replaceable, which forms a shearing relationship with a lower cutting bar 546 along edge 544 to cut extending sheet metal material into blanks as the die arrangement compresses.

Lower die 560 includes a radiused male portion forming a radius and diameter corresponding to the desired inner arcuate radius and curve of the saddle to be formed. The radius may extend for approximately 180°, or optionally may include a slight variation or be slightly oversized to accommodate expected spring back of the metal material being bent. Optionally arranged on lower die 560 are partial or full ribs 564 to press corresponding partial or 180° ribs into the metal blank being bent. Lower die 560 optionally but preferably includes slightly tapered flared portions 567 at each end to impart a flare to the width edges of the blank 230 being bent. Optionally, lower die 560 can be arranged to accommodate blanks of length $L_1$ or $L_2$ as discussed with respect to other embodiments herein.

Preferably, the center of the male bending portion is spaced from forward edge 544 at a distance corresponding to half of the distance between the cutting tips of the cutting pieces 527 along trim axis T-T and forward edge 544.

Upper die 580 has an upper female radiused bending portion matching and complementary to the male bending portion of lower die 560. The female bending portion allows, for example with indentations or grooves, for partial or full ribs 564 to press ribs of lower die 560 into the metal being bent.

In operation of the illustrated progressive die, shown in FIGS. 15-18, a ribbon or strip of metal 235 is fed into bed 512 via entry slot 514. Prior to the introduction of the metal, cutting pieces 527 and cutting punches 525 are arranged at a distance from shearing edge 544 corresponding to the width of the desired blank 230 to be cut and then formed into the desired circumference measurement of the saddle being produced. Ejector assembly 590 is not illustrated in FIGS. 15-18 for ease of reference.

In a loading step, the leading edge of metal 235 including the continuous length of adhesive tape 117 and release cover 113 on the underside is advanced into bed 512 until the forward edge is adjacent the shear edge of cutting bar 546. Optionally, the metal may be advanced further or less; however, a scrap portion will typically need to be cut and discarded in the first cycle or two of the die assembly to create a leading edge with two rounded corners.

In a first cycle of operation, trimming assembly 510 and bending assembly 550 compress concurrently to shear off any excess material extending beyond cutting bar 546 and also to punch radiused convex indentations as cut-out shapes 255 along axis T-T into the metal material. Upon completion of the first compression and release cycle, the metal strip is advanced a distance through the die. In the next position, illustrated in FIG. 15, the forward or leading portion of the metal 235 has rounded corners. Additionally, the next portion in which the radiused indentations 255 were made along an axis T-T is aligned with the forward edge 544 and cutting bar 546. The forward portion of the metal extends between lower die 560 and upper die 580.

Upon the next compression cycle, carrying plate 520 is lowered to simultaneously lower cutting pieces 525 and upper die 580. During the compression step, cutting bars 584 and 546 cut the metal material 235 along one axis T-T, leaving a separated blank 230 which is then bent between the upper and low dies 580 and 560. Simultaneously, cutting pieces 525 are punching the next radiused indentations 255 into the metal of material 235 along the next axis T-T. Each compression and cutting cycle by punches 525 forms two rounded corners 260 on one side of an axis T-T and two rounded corners 260 on the opposite side of the axis T-T. When the metal is advanced and then cut along that axis T-T, these form rounded trailing corners of a prior blank and rounded leading corners on the edge of the next blank.

Figure 16:
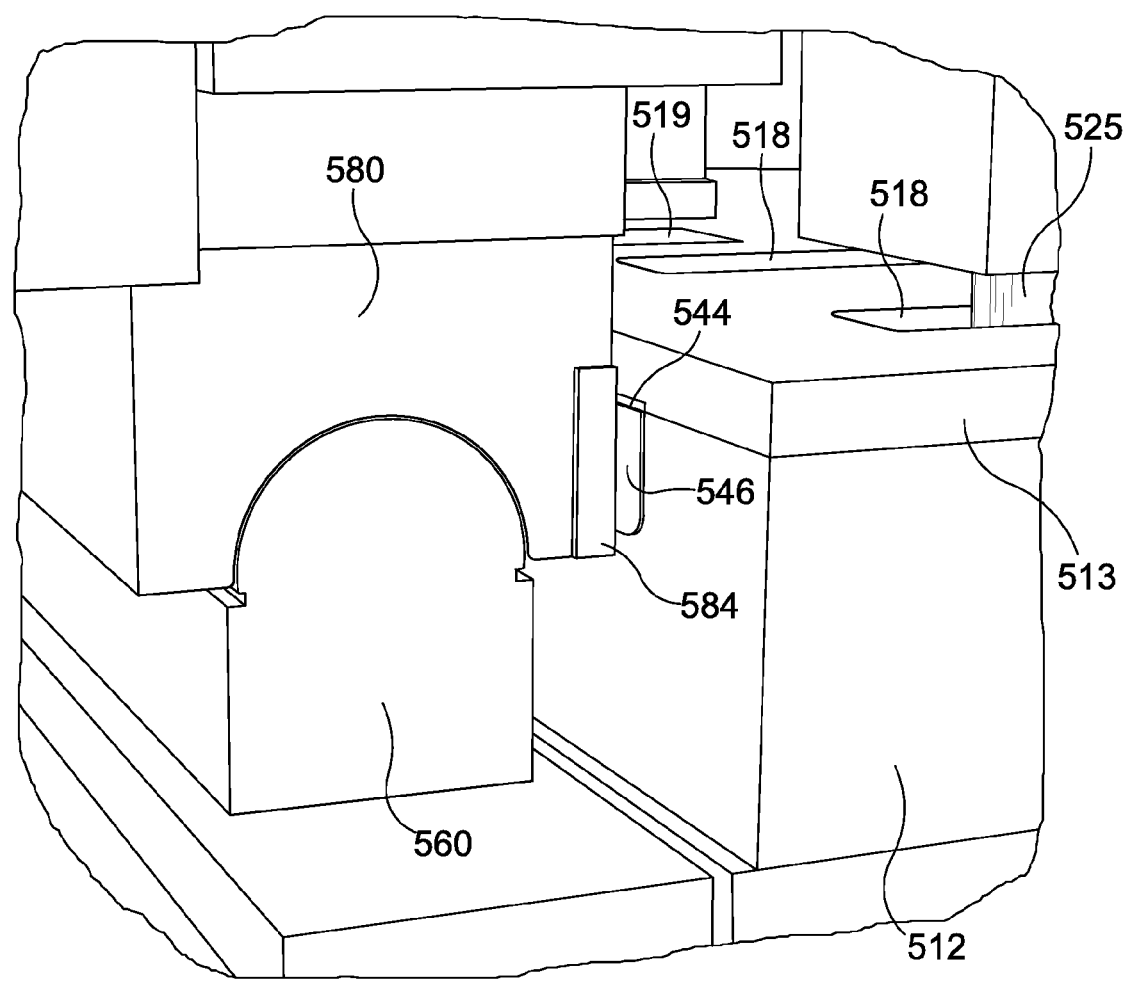
Figure 17:
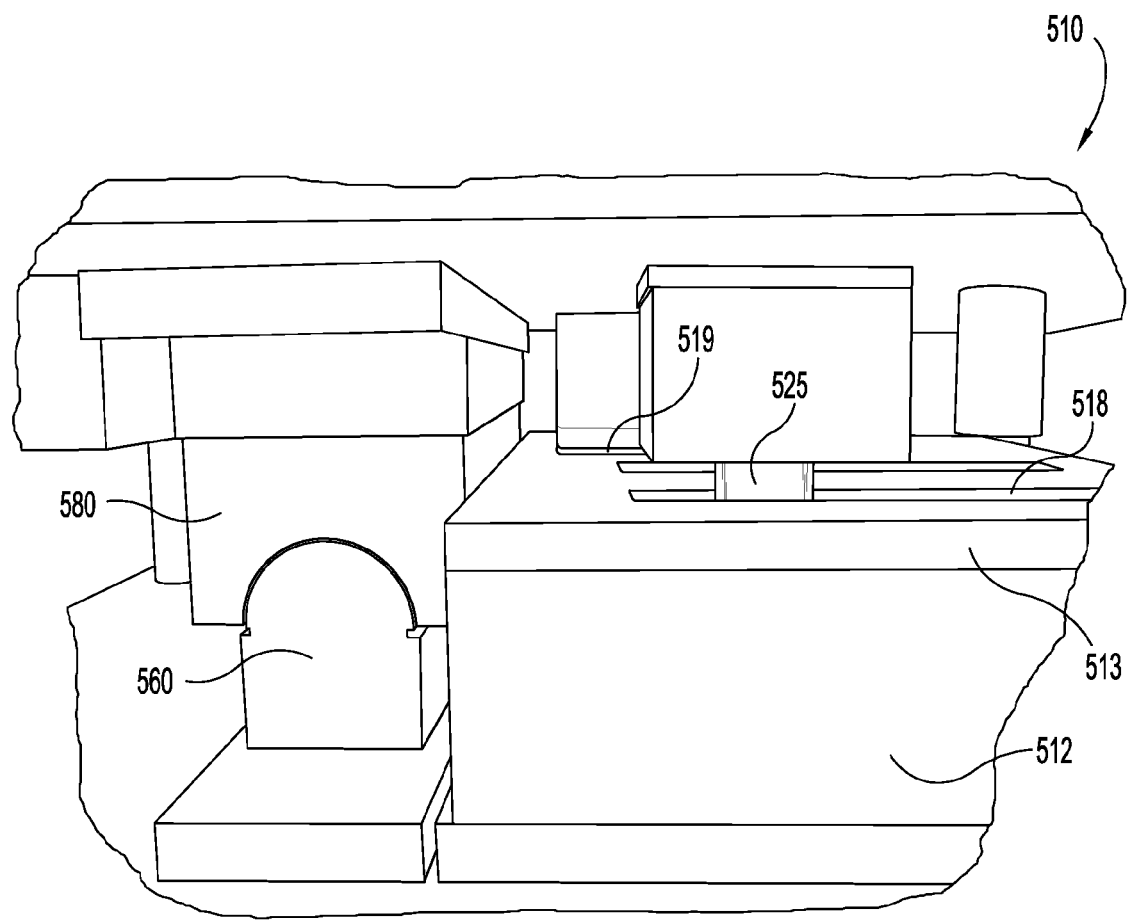

As the die closes in the second and successive iterations as illustrated in FIGS. 16 and 17, the upper die 580 and the lower die 560 contact and hold the metal piece between them in a three point contact grasp. As the metal is cut and the dies continue to compress, the metal is bent around the male radius until the desired bend arc has been imparted to the blank.

Figure 18:
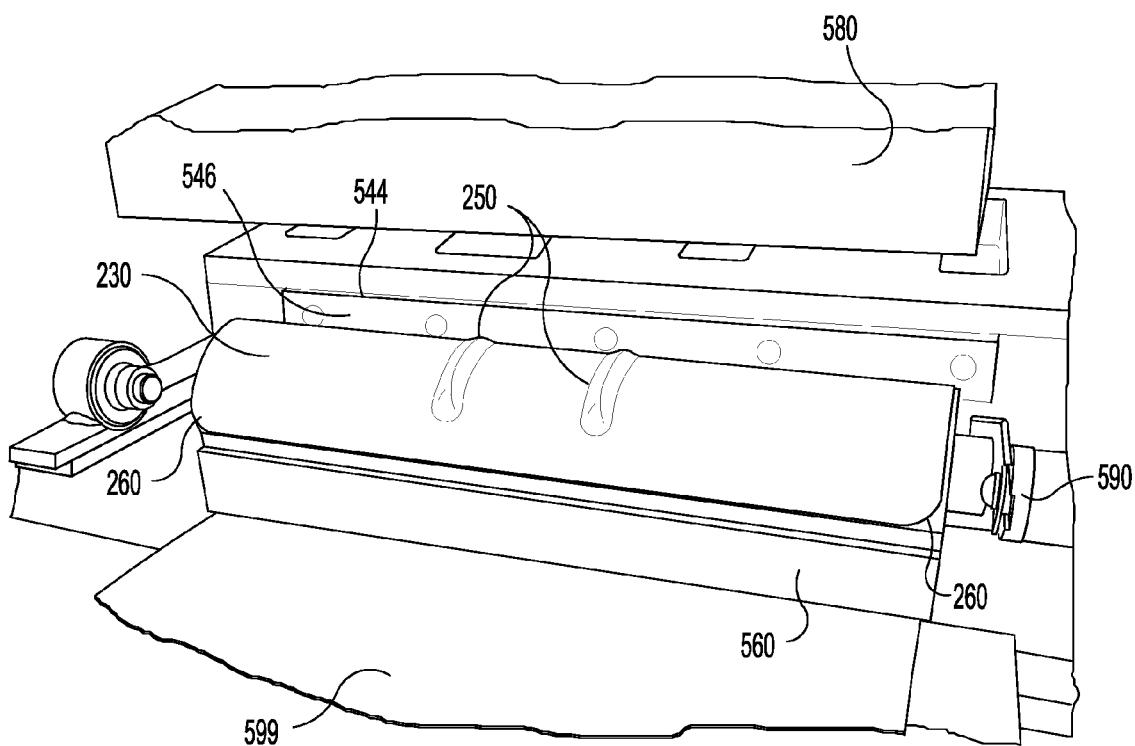

Upon completion of a compression cycle, once the die portions are separated as seen in FIG. 18, the formed arcuate saddle 230 may be removed from lower die 560. The metal material is then advanced a distance to provide the next portion of material to be cut off and bent in bending assembly and the next portion of material to be cut with indentations 255 in the trimming assembly. The timing of compression cycles, removal of finished saddles and advancing material is preferably synchronized. The operation may be repeated as desired to form multiple arcuate saddles with rounded corners.

Figure 19:
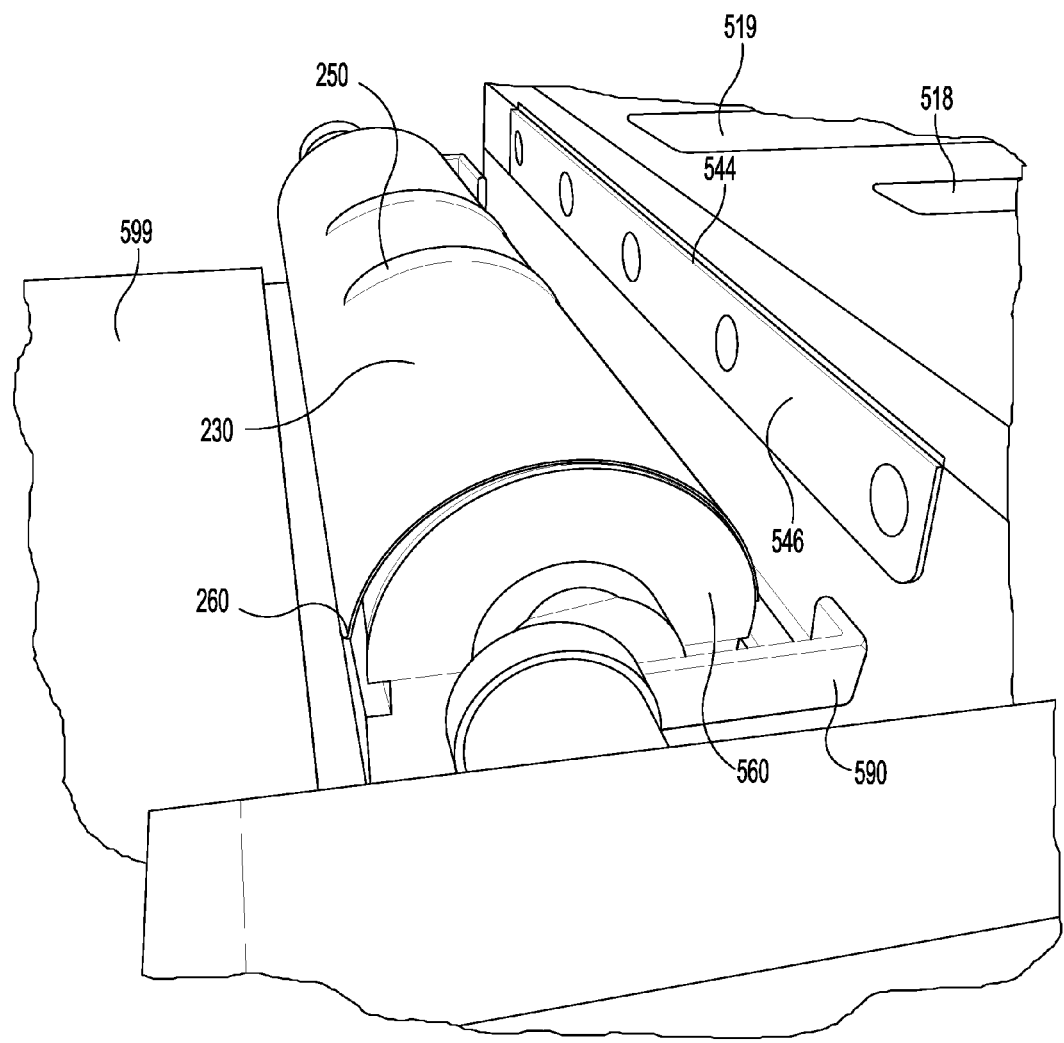
FIGS. 19-21 illustrate an ejector assembly useable in the embodiments of FIGS. 7-9.
Figure 20:
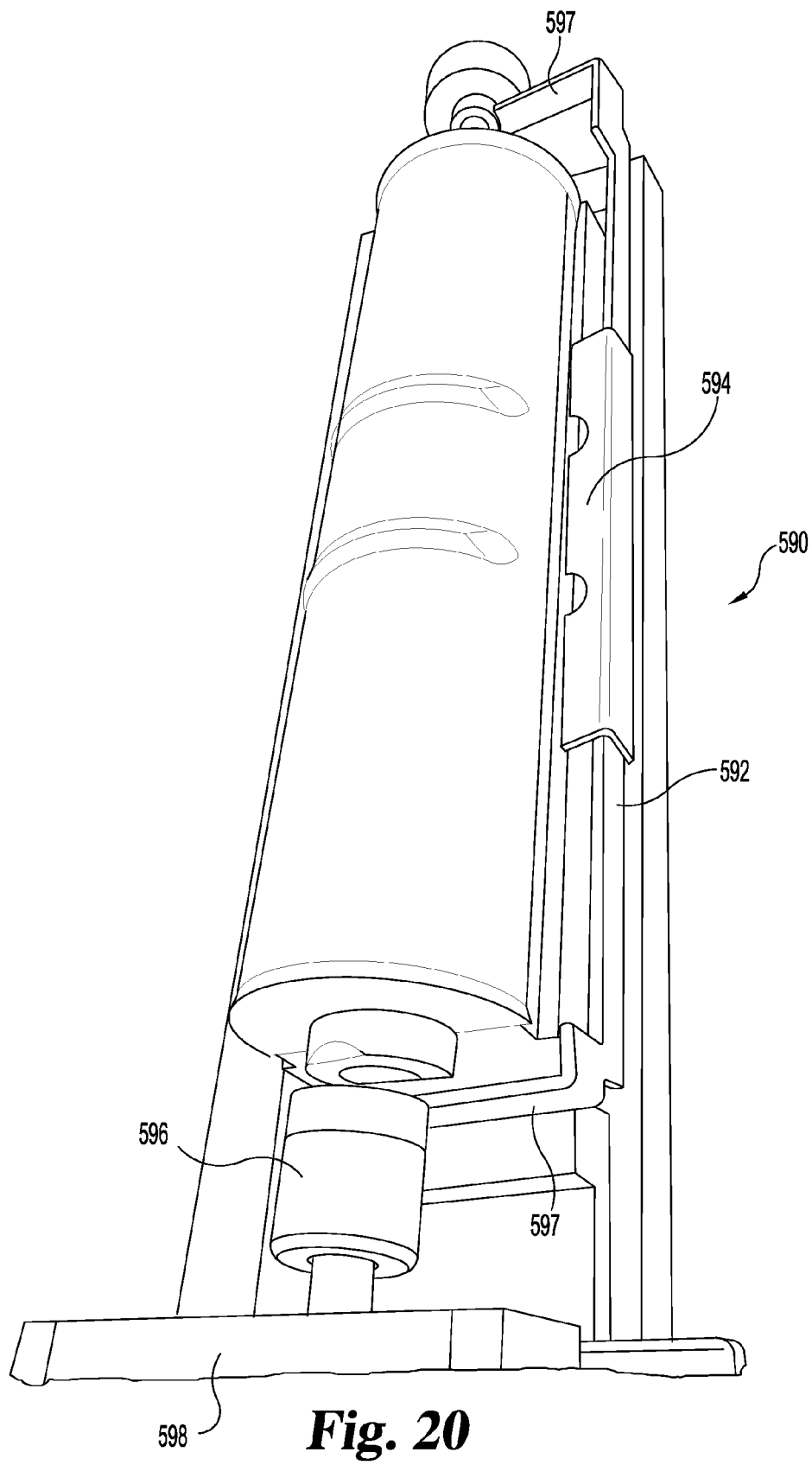
Figure 21:
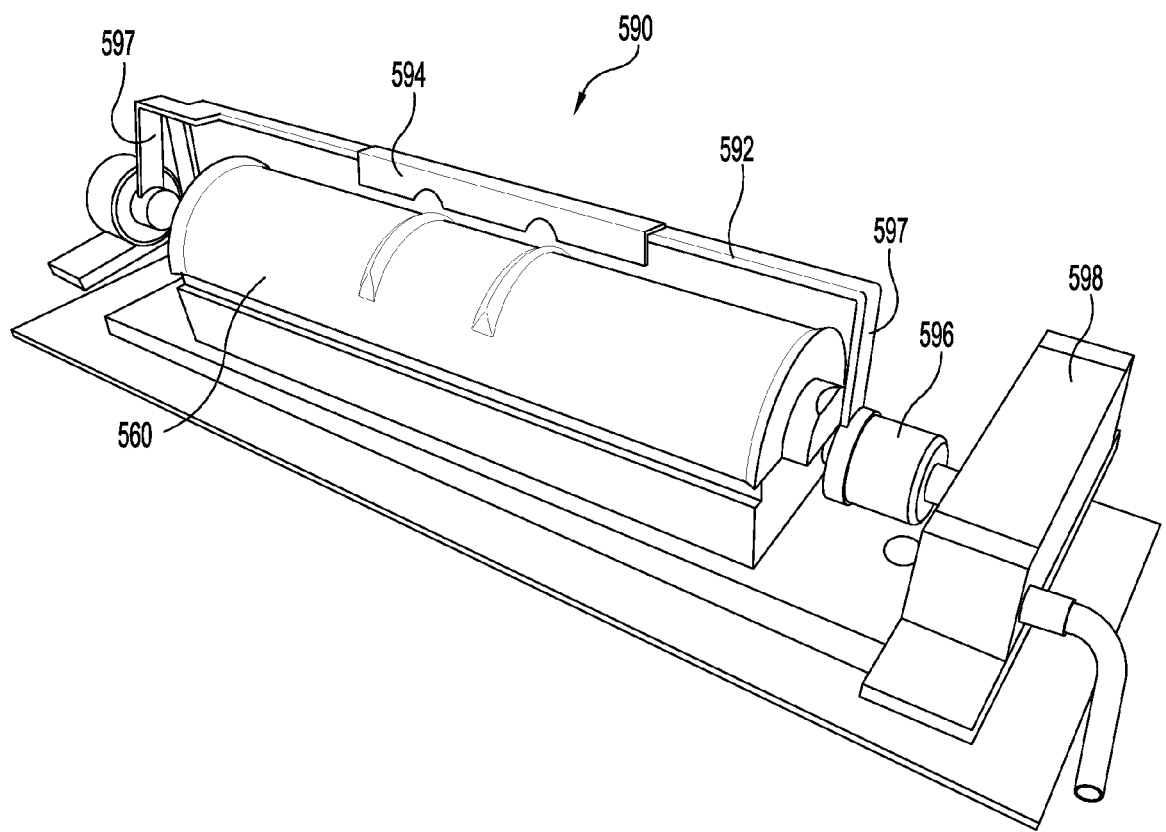

In certain preferred embodiments, an ejector mechanism such as ejector assembly 590 can be used to eject a formed arcuate saddle from lower die 560, for example onto a gravity slide 599 into a collection area. Details of an example ejector assembly 590 are illustrated in FIGS. 19-21 among others. In the illustrated embodiment, ejector assembly 590 includes a longitudinal arm 592 extending alongside and parallel to the base of lower die 560. In its lowered position, arm 592 lies between lower die 560 and bed 512. Preferably a scraper portion 594 is formed with or attached to arm 592, although alternately the arm can directly function as the scraper portion. Scraper portion is arranged along selected portions or entirely along the length of lower die 560 and extends closely adjacent the face of lower die 560.

Ejector assembly 590 includes two radial legs 597 having outer ends formed with or attached to opposing ends of arm 592 and inner ends aligned along a longitudinal axis defined by a pair of pivot points. At least one of the inner leg ends is mounted to an axle portion 596 as a crank arm at a fixed angular relationship which allows and causes the radial legs 597, arm 592 and scraper portion 594 to rotate around the pivot point and lower die 560 when the axle portion 596 is rotated. One end of ejector assembly 590 includes a rotation mechanism 598 operable to rotate axle portion 596 and thus ejector assembly 590 on demand. In one example embodiment, rotation mechanism 598 includes a compressed air powered cylinder which expands and contracts and correspondingly rotates a crank arm or gearing inside rotation mechanism 598 to correspondingly rotate the axle and ejector arm 592.

Preferably the closest separation distance between scraper portion 594 and the face of lower die 560 is less than the thickness of the sheet metal material being used. In one embodiment, when ejector assembly 590 is operated, scraper portion 594 impacts the lower edge of the finished saddle and propels the saddle off of the lower die and onto slide 599 directed to a collection point. The pivot axis may be aligned with the axis defined by the radius of die 560. Alternately, scraper portion 594 may contact the surface or other aspects of the finished saddle and may follow a path not corresponding to the radius of the lower die, such as a radial path eccentric to the die or following a tangential approach path. In certain embodiments, engagement features such as rubber feet or pads may be used to allow the ejector assembly to contact and propel the saddle while not wearing on the lower die.

In certain preferred embodiments, compressive die assembly 500 and other arrangements herein include appropriate sensors and PLCs to monitor material within the assembly before, during and after compression cycles. Such sensors may signal operational readiness states. Preferably sensors may be used to detect whether material is within bed 512 and whether material is present and ready to be bent between lower die 560 and upper die 580. Further a sensor and PLC preferably detects when an arcuate saddle has been formed and, upon sufficient separation of the dies, triggers the ejector assembly 590 to eject the finished saddle from lower die 560. Completion of a compression cycle and ejection of a finished saddle preferably further is synchronized with a signal to an automated feed mechanism to advance the metal material the next desired distance within arrangement 500 for the next cycle.

Figure 22:
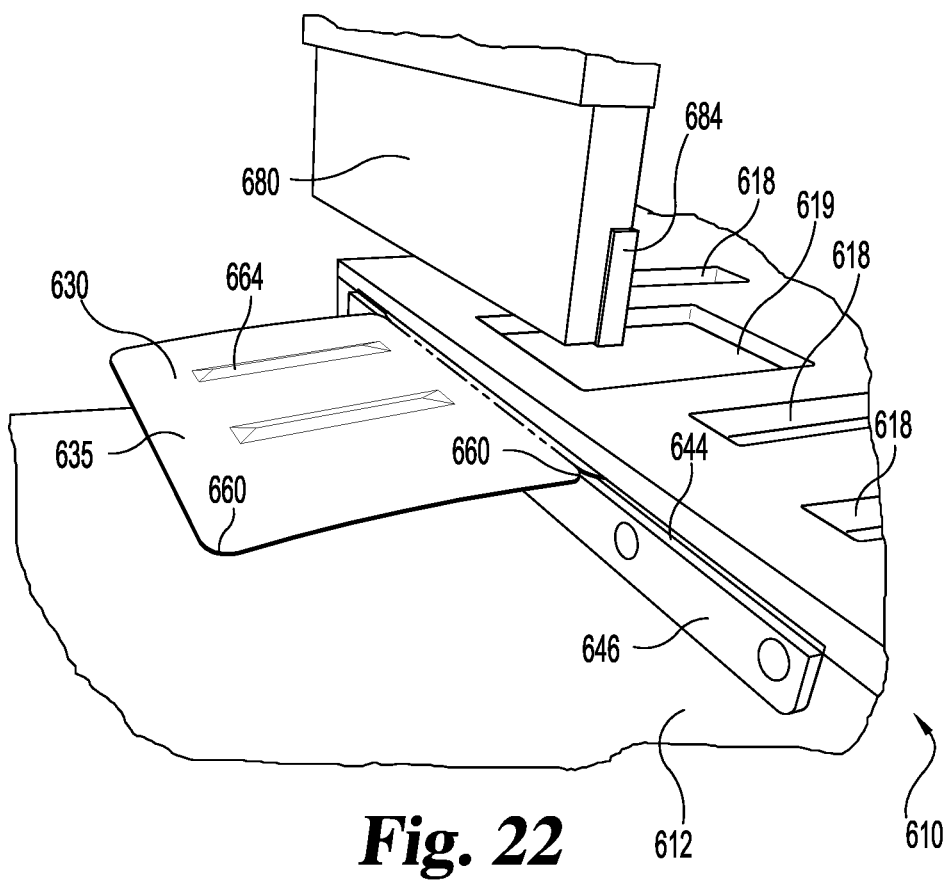
FIGS. 22-24 illustrate perspective views of a cutting assembly usable in certain embodiments.
Figure 23:
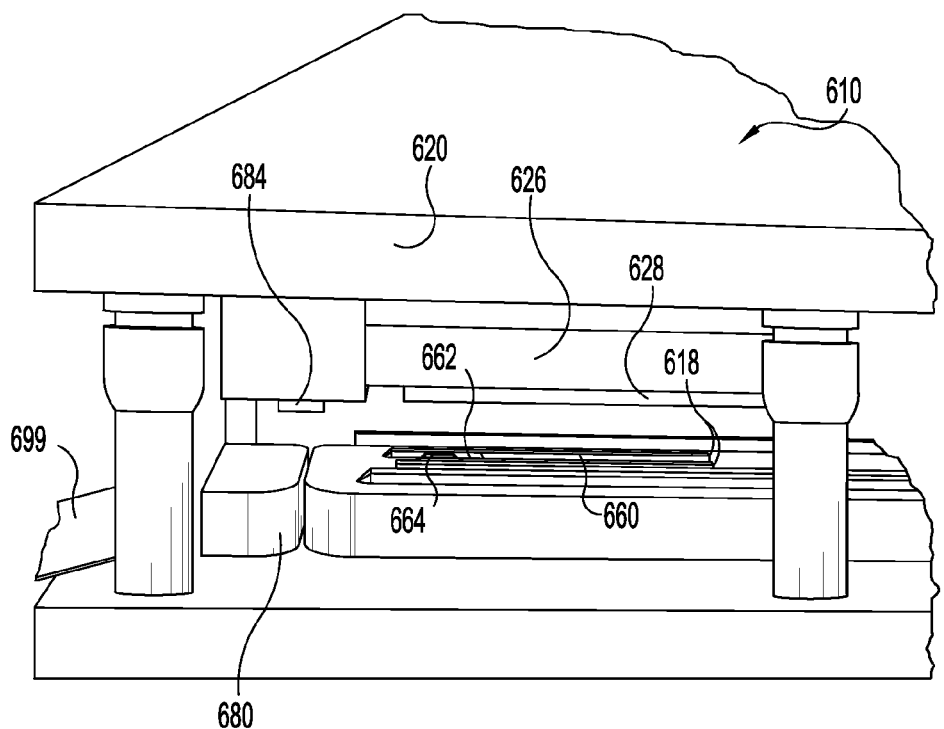
Figure 24:
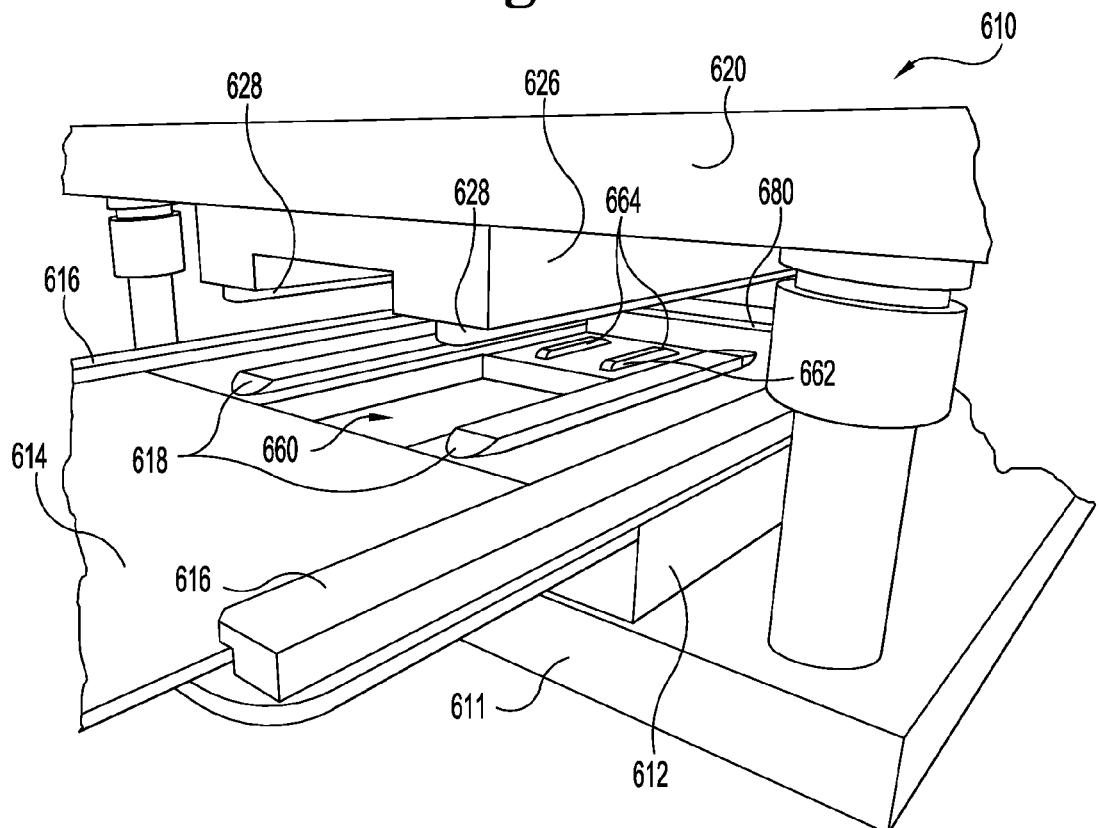

A further example embodiment of a manufacturing arrangement is illustrated in FIGS. 22-24. Cutting assembly 610 includes a bed 612 carried on a base plate 611. A sheet metal path sized to receive sheet metal material is formed along bed entry 614 between side rails 616. Bed 612 further includes two slide rails 618 along the metal path, which slightly raise the metal material as it is fed into the assembly. Bed 612 further defines an inset or lowered area 660 between slide rails 618. A rib block 662 can be placed within inset area 660. In certain embodiments, rib block 662 includes upward protruding rib portions 664 along all or a portion of the block length. Rib block 662 preferably can be mounted at selected desired positions within inset area 660 to correspond to desired placement of rib indentations in the metal material.

In the illustrated embodiment, the tops of slide rails 618 are slightly taller than the height of protruding rib portions 664 so that material travelling over the slide rails travels above protruding rib portions 664. In this arrangement, slide rails 618 are preferably mounted within slots in bed 612. Specifically, slide rails 618 are resiliently supported by springs within the bed to allow slide rails 618 to depress under pressure during the compression cycle and to be biased to rise upward when the pressure is released.

The forward portion of bed 612 defines a lower cutting profile 680. Lower cutting profile extends lengthwise across the width of bed 612, and preferably corresponds in length to the width of the metal material to be cut. Lower cutting profile 680 has two convex radiused portions at each end. The radiused portions extend inward from the edges to a longitudinal channel connecting the radiused portions at opposing ends of the profile. An exit slide 699 is arranged along the path forward of cutting profile 680.

The upper portion of assembly includes carrying plate 620 arranged in a compressive arrangement with bed 612. Carrying plate 620 includes a stamping portion 626 arranged opposite slide rails 618 and ribs 664. Stamping portions 626 includes clamping rails 628 arranged opposite sliding rails 618. An upper rib block is mounted between clamping rails 628 and aligned opposite lower rib block 662. The upper rib block defines rib portions complimentary to the rib portions in the lower rib block, such a grooves corresponding to and aligned with protruding rib portions 664.

The forward portion of carrying plate 620 includes an upper cutting or punch portion 684. Punch portion 684 is aligned with the placement and length of lower cutting profile 680 across the width of bed 612, and preferably corresponds in length to the width of the metal material to be cut. Punch portion 684 is complementary in size and shape to lower cutting profile 680, and defines two concave radiused portions at each end which are connected by a thin punch blade.

In operation, a coil or ribbon of metal material carrying the continuous adhesive strip is fed into assembly 610 via entry 614. As the metal is advanced, it slides upward and over sliding rails 618 and thus travels above protruding ribs 664. In the loading cycle, the forward edge of the metal is advanced at least slightly forward of cutting profile 680. Carrying plate 620 is then compressed downward. During the downward compression, clamping rails 628 contact the metal material and depress it, correspondingly depressing sliding rails 618. Depression of sliding rails 618, allows the metal material to bear against the protruding rib portions 664 which then stamps the metal between the protruding rib portions 664 and the corresponding rib portions in the upper rib block to form rib indentations. Upon upward motion of carrying plate 620, sliding rails 618 rise, in turn raising the material above the protruding rib portions 664, enabling the material to travel forward without hindrance by the rib portions.

Concurrently, with stamping rib indentations into the material, punch portion 684 engages the metal against lower cutting profile 680 in a shearing arrangement which cuts a piece of material from the metal. The cut shape forms convex rounded corners on the trailing edge of the metal material forward of cutting profile 680 and forms convex rounded portions on the leading edge of the material rearward of cutting profile 680. Additionally, the blade of punch portion 684 cuts the material along the channel of profile 680, separating metal material forward of cutting profile 680 from the material rearward of cutting profile 680. The separated metal can then be removed from assembly 610, for example by being pushed to fall along slide 699.

After upward movement of carrying plate 620, the metal material is advanced forward a predetermined distance corresponding to the circumferential width of the saddle to be formed. This places the metal material containing the rib indentations stamped in the prior cycle forward of cutting profile 680. Upon the next compression cycle, cutting profile 680 and punch portion 684 forms convex rounded corners on the trailing edge of the metal material forward of cutting profile 680 and separate the material as a flat, ribbed blank of material with rounded corners. Currently, rib portions are stamped into the next portion of the metal material. The compression and advancement cycle can be repeated to create additional flat, ribbed saddle blanks.

The foregoing describes saddles having an adhesive strip extending transverse of the axis of the saddle. It will be appreciated, however, that many of the same advantages are obtained by placement of an adhesive strip extending parallel to the longitudinal axis of a saddle. In this embodiment, shown in FIG. 25, the saddle 100' includes the lengthwise adhesive strip 112' and release liner 113' extending along the inner face of the interior channel of the saddle and centered between the sides 106'.

The adhesive strip 112' may be secured to a saddle in a variety of manners. For example, a double-sided adhesive tape may be attached to a continuous sheet of material, which is subsequently cut into saddle blanks and then stamped or rolled to form the arcuate saddle. In contrast to the process for the transverse adhesive strip, the orientation of the stamping die would be rotated 90° in order to orient the adhesive strip along the longitudinal axis. This would require a separation of the cutting and stamping stations. As an alternative approach, for example, the adhesive strip could be attached to the continuous sheet material and the saddle blanks cut, then it oriented such that it is rolled into an arcuate saddle with the adhesive strip extending longitudinally.

Figure 25:
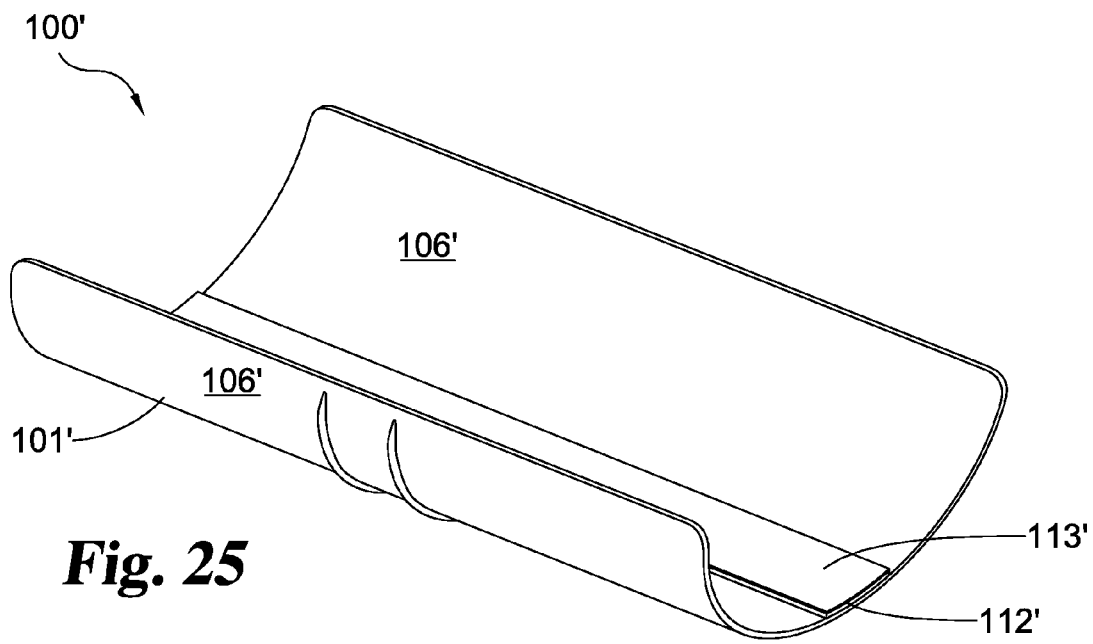
FIG. 25 is a perspective view showing an arcuate saddle having an adhesive strip extending parallel to the longitudinal axis of the saddle.
Figure 26:
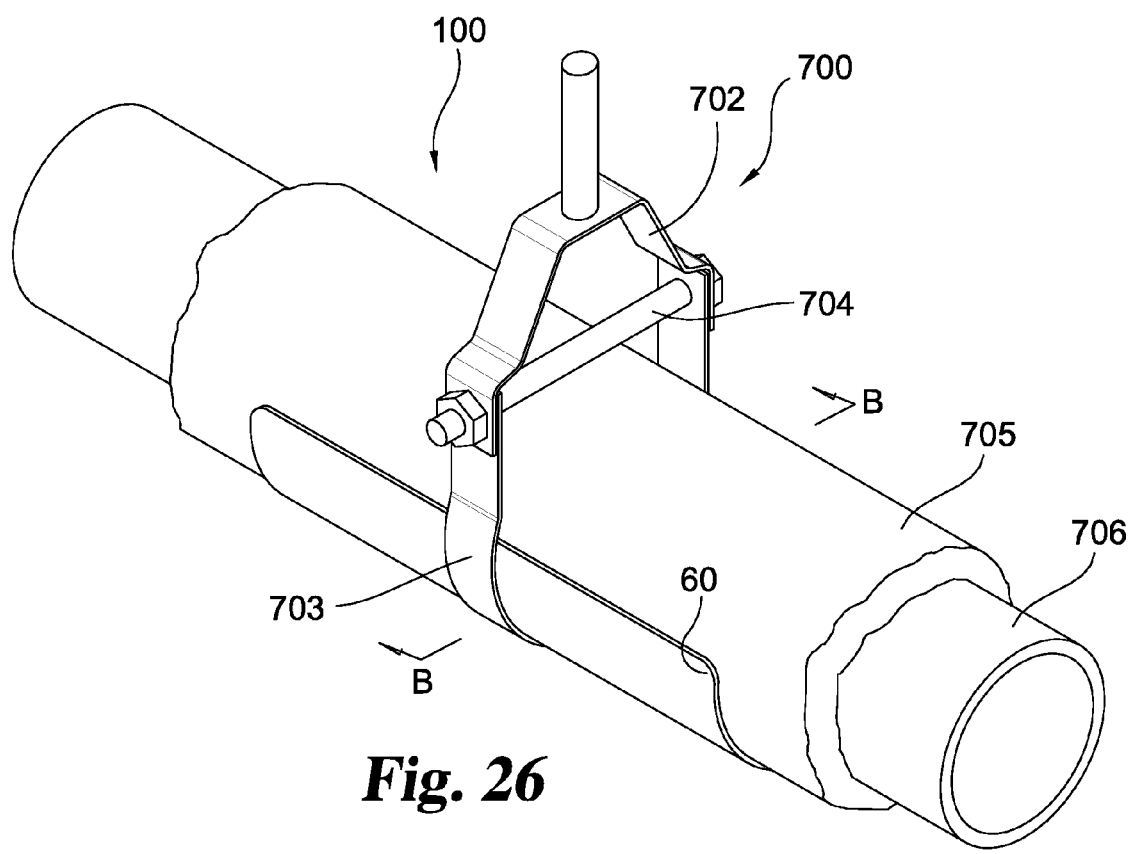
FIG. 26 is a perspective view showing a pipe and a supporting assembly including an arcuate saddle of the present invention.
Figure 27:
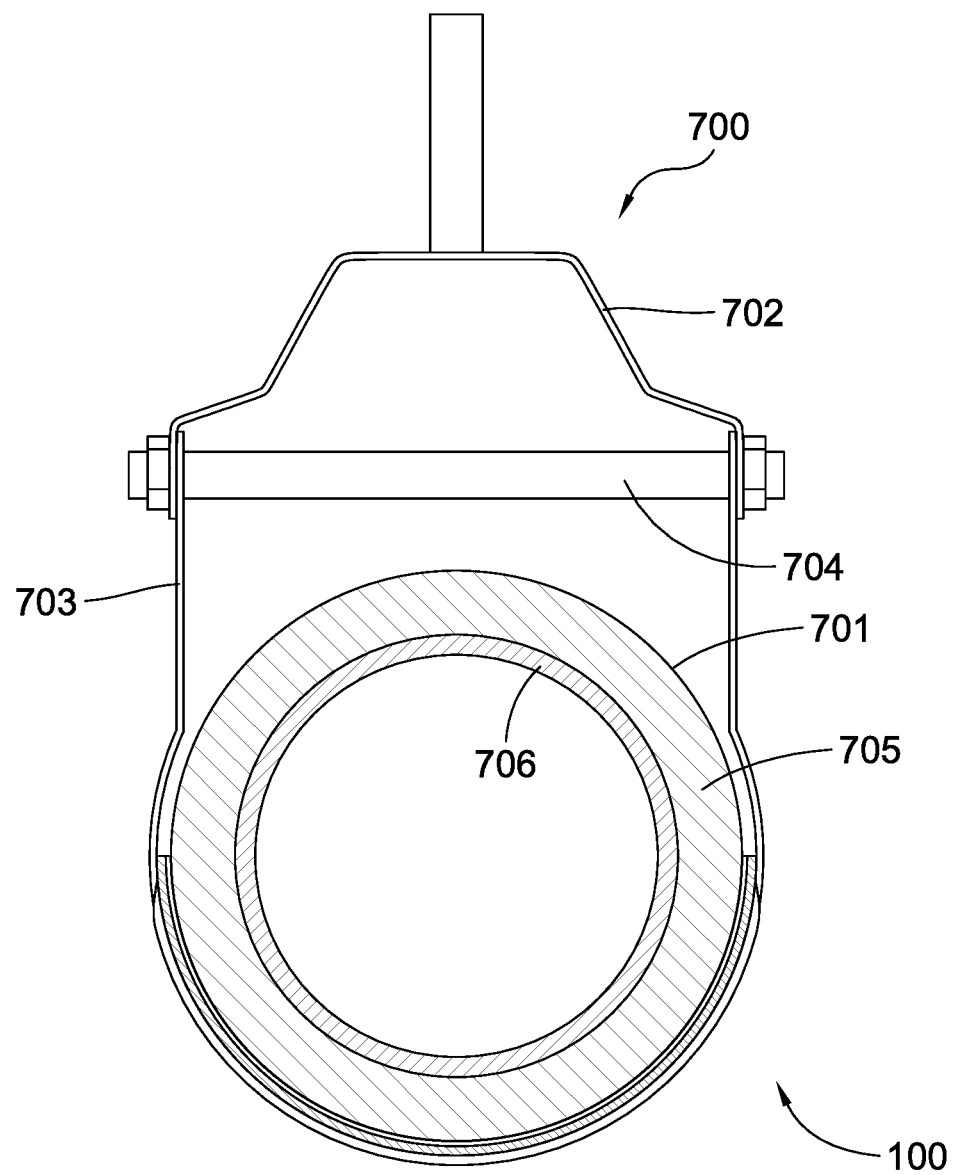
FIG. 27 is a partial cross-sectional view of the pipe and assembly taken along line B-B in FIG. 26.

Illustrated in FIGS. 26 and 27 is a typical assembly of a hanger 700 supporting a saddle 100 which wraps around a pipe 701 or insulation 706 Hanger 700, for example the clevis hanger illustrated in detail in FIG. 25, typically includes an upper portion or bracket 702 which can be suspended from a building structure, a lower bracket 703 for receiving and engaging the saddle and pipe, and optionally includes a pivot 704 between the upper and lower brackets to allow some relative movement of the hanger portions, if necessary due to vibration, expansion or contraction. Alternately, the hanger can be one piece or a strap which suspends a pipe and saddle.

When securing a pipe to a supporting surface, an installer removes the release liner 113 from adhesive strip 112. The saddle is then placed in the desired position relative to the pipe to be supported and is pressed against the pipe to secure the saddle by means of the adhesive strip. The lower bracket 703 and upper bracket 702 are then assembled together and the supporting bracket is secured to the support surface, e.g. a ceiling joist or other overhead structural element.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An arcuate saddle for supporting pipe, comprising:
   a saddle having a length and a width and formed in an arcuate shape having a constant saddle radius, said saddle having exterior and interior faces and an interior channel defined by the interior face of said saddle and extending longitudinally of said saddle for the length of said saddle to receive a pipe; and
   an adhesive strip extending along the interior face of said saddle, said adhesive strip comprising a double-sided adhesive tape having first and second faces including adhesive material, the first face being secured to the interior face of said saddle and the second face being covered by a release liner, said adhesive strip extending transverse of the longitudinal axis of the interior channel, said adhesive strip being applied to said saddle prior to said saddle being formed in an arcuate shape.

2. The saddle of claim 1 in which said adhesive strip extends fully between the length sides of said saddle.

3. The saddle of claim 1 in which the adhesive strip is centered between the arcuate width sides of said saddle.

4. The saddle of claim 3 in which said saddle includes formed, parallel, spaced-apart ribs protruding from the exterior face, said ribs each extending in a direction substantially perpendicular to said length sides, said adhesive strip being positioned between the ribs.

5. The saddle of claim 4 in which the ribs extend fully between the length sides of said saddle.

6. The saddle of claim 1 and including at least two spaced-apart adhesive strips extending along the interior face of said saddle transverse of the longitudinal axis of the interior channel, each adhesive strip comprising a double-sided adhesive tape having first and second faces including adhesive material, each first face being secured to the interior face of said saddle and a release liner covering the second face of each of said adhesive strips, each adhesive strip extending transverse of the longitudinal axis of the interior channel, each adhesive strip being applied to said saddle prior to said saddle being formed in an arcuate shape.

7. A pipe and support assembly comprising
   a pipe;
   a saddle having its length greater than its width and formed in a 180 degree arc having a constant saddle radius along its width, said saddle having two parallel length sides and two arcuate width sides, said saddle having exterior and interior faces and an interior channel defined by the interior face of said saddle and extending longitudinally of the saddle for the length of said saddle, said pipe being received within the interior channel; and
   an adhesive strip extending along the interior face of said saddle and securing said pipe to said saddle, said adhesive strip comprising a double-sided adhesive tape having first and second faces including adhesive material, the first face being secured to the interior face of said saddle and the second face securing said saddle to said pipe, said adhesive strip extending transverse of the longitudinal axis of the interior channel, said adhesive strip being applied to said saddle prior to said saddle being formed in an arcuate shape.

8. The pipe and support assembly of claim 7 and further comprising a hanger coupling said saddle to a support surface extending above said assembly.

9. A method for forming a saddle assembly, the saddle assembly comprising a saddle having a length and a width and formed in an arcuate shape having a constant saddle radius, the saddle having exterior and interior faces and an interior channel defined by the interior face of the saddle and extending longitudinally of the saddle for the length of the saddle to receive a pipe; the saddle assembly further including an adhesive strip extending along the interior face of the saddle, the adhesive strip extending transverse of the longitudinal axis of the interior channel, the method comprising:
   applying a double sided adhesive tape to a saddle material, the double sided adhesive tape having first and second faces including adhesive material, the first face being secured to the interior face of the saddle material; and
   after said applying, forming the saddle material into an arcuate shape.

10. The method of claim 9 in which the second face of the adhesive tape is covered by a release liner.

11. The method of claim 9 in which said applying comprises applying a continuous length of adhesive tape to a continuous length of saddle material, said method further comprising:
   cutting the saddle material including the adhesive tape into saddle blanks; and
   thereafter forming the saddle blanks into arcuate saddles having the adhesive tape on the concave surfaces of the saddles.

12. The method of claim 11 in which said applying comprises applying an adhesive material having a release liner on the second face.

13. The method of claim 12 in which said applying comprises removing a release liner from the first face of the adhesive material to expose the adhesive material on the first face, and subsequently applying the adhesive material to have the first face securing the adhesive tape to the saddle material.

14. The method of claim 13 in which said forming the saddle blanks into arcuate saddles comprises forming ribs in the arcuate saddles extending parallel to the adhesive tape.

15. The saddle of claim 4 in which said adhesive strip is applied to said saddle before the ribs are formed.

* * * * *